US 10,836,453 B2

(12) United States Patent
Tsuchizawa et al.

(10) Patent No.: US 10,836,453 B2
(45) Date of Patent: Nov. 17, 2020

(54) BICYCLE CONTROLLER AND BICYCLE CONTROL SYSTEM INCLUDING BICYCLE CONTROLLER

(71) Applicant: Shimano Inc., Osaka (JP)

(72) Inventors: Yasuhiro Tsuchizawa, Osaka (JP); Hiroshi Matsuda, Osaka (JP); Kazuhiro Fujii, Osaka (JP); Satoshi Shahana, Osaka (JP); Hiroyuki Miyoshi, Osaka (JP); Etsuyoshi Watarai, Osaka (JP)

(73) Assignee: Shimano Inc., Osaka (JP)

( * ) Notice: Subject to any disclaimer, the term of this patent is extended or adjusted under 35 U.S.C. 154(b) by 263 days.

(21) Appl. No.: 15/787,191

(22) Filed: Oct. 18, 2017

(65) Prior Publication Data

US 2018/0118305 A1    May 3, 2018

(30) Foreign Application Priority Data

Oct. 31, 2016    (JP) .................................. 2016-213622

(51) Int. Cl.
    *B62M 25/08*    (2006.01)
    *B62M 6/55*    (2010.01)
    (Continued)

(52) U.S. Cl.
    CPC .............. *B62M 25/08* (2013.01); *B62M 6/45* (2013.01); *B62M 6/50* (2013.01); *B62M 6/55* (2013.01);
    (Continued)

(58) Field of Classification Search
    None
    See application file for complete search history.

(56) References Cited

U.S. PATENT DOCUMENTS 5,226,501 A * 7/1993 Takata ................ B60L 15/2063
                                                              180/19.1
5,254,044 A * 10/1993 Anderson .............. B62M 9/122
                                                              474/103
(Continued)

FOREIGN PATENT DOCUMENTS

CN      103373433 A      10/2013
CN      105270557 A       1/2016
(Continued)

OTHER PUBLICATIONS

Office Action associated with Japanese Filling of this Application.*
(Continued)

*Primary Examiner* — Colby M Hansen
(74) *Attorney, Agent, or Firm* — Global IP Counselors, LLP

(57) ABSTRACT

A bicycle controller includes an electronic control unit. The electronic control unit controls a transmission device that changes a ratio of a rotational speed of a wheel of a bicycle to a rotational speed of a crank of the bicycle, and a motor that transmits torque to an upstream side of the transmission device in a transmission path of a manual driving force that is input to the crank. The electronic control unit switches between a first mode that drives the motor in accordance with the manual driving force and a second mode that allows the motor to be driven to assist walking of the bicycle. The electronic control unit controls the transmission device to change the ratio upon detection of the electronic control unit switching between the first mode and the second mode or the electronic control unit being in the second mode.

21 Claims, 17 Drawing Sheets

(51) Int. Cl.
  B62M 9/122  (2010.01)
  B62M 9/132  (2010.01)
  B62M 6/50   (2010.01)
  F16H 61/662 (2006.01)
  B62M 6/45   (2010.01)
  G01P 3/489  (2006.01)

(52) U.S. Cl.
  CPC ............ *B62M 9/122* (2013.01); *B62M 9/132* (2013.01); *F16H 61/66236* (2013.01); *F16H 61/66259* (2013.01); *G01P 3/489* (2013.01)

(56) References Cited

U.S. PATENT DOCUMENTS

| | | | | |
|---|---|---|---|---|
| 6,247,548 | B1* | 6/2001 | Hayashi | B60L 58/25 |
| | | | | 180/206.2 |
| 8,505,666 | B2* | 8/2013 | Kyoden | B62J 3/00 |
| | | | | 180/206.4 |
| 9,463,845 | B2* | 10/2016 | Kuroda | B62M 9/12 |
| 2002/0120382 | A1* | 8/2002 | Hatanaka | B62M 6/45 |
| | | | | 701/70 |
| 2015/0352973 | A1 | 12/2015 | Gao | |
| 2015/0367750 | A1* | 12/2015 | Takamoto | B60L 15/20 |
| | | | | 701/22 |

FOREIGN PATENT DOCUMENTS

| | | |
|---|---|---|
| DE | 60116161 T2 | 6/2006 |
| DE | 10 2016 209 570 B3 | 8/2017 |
| JP | 60-176828 A | 9/1985 |
| JP | 4-358988 A | 12/1992 |
| JP | 9-123979 A | 5/1997 |
| JP | 11-124076 A | 5/1999 |
| JP | 11-180376 A | 7/1999 |
| JP | 2003-095182 A | 4/2003 |
| JP | 3647965 B2 | 5/2005 |
| JP | 2012-144061 A | 8/2012 |
| JP | 5686876 B1 | 3/2015 |
| JP | 2015-231764 A | 12/2015 |

OTHER PUBLICATIONS

Office Action associated with Chineses Filling of this Application.*

* cited by examiner

BICYCLE CONTROLLER AND BICYCLE CONTROL SYSTEM INCLUDING BICYCLE CONTROLLER

CROSS-REFERENCE TO RELATED APPLICATIONS

This application claims priority to Japanese Patent Application No. 2016-213622, filed on Oct. 31, 2016. The entire disclosure of Japanese Patent Application No. 2016-213622 is hereby incorporated herein by reference,

BACKGROUND

Field of the Invention

The present invention generally relates to a bicycle controller and a bicycle control system including a bicycle controller.

Background Information

Japanese Laid-Open Patent Publication No. 2012-144061 (Patent document 1) discloses a bicycle controller that drives a motor if an operation unit is operated to assist propulsion of a bicycle when a rider walks the bicycle.

SUMMARY

In Patent document 1, the bicycle controller controls the motor in accordance with the rotational speed of the motor that is predetermined for a case in which the rider walks the bicycle. However, the bicycle controller of Patent document 1 does not take into account bicycles that include transmission devices.

It is an object of the present invention to provide a bicycle controller and a bicycle control system for a bicycle including a transmission device that uses a motor in an optimal manner when the rider walks and pushes the bicycle.

In a first aspect of the invention, a bicycle controller includes an electronic control unit that controls a transmission device, which is configured to change a ratio of a rotational speed of a wheel of a bicycle to a rotational speed of a crank of the bicycle, and a motor, which transmits torque to an upstream side of the transmission device in a transmission path of manual driving force that is input to the crank. The electronic control unit is configured to switch between a first mode that drives the motor in accordance with the manual driving force and a second mode that allows the motor to be driven to assist movement of the bicycle while a rider walks and pushes the bicycle. The electronic control unit is configured to control the transmission device to change the ratio upon detection of the electronic control unit switching between the first mode and the second mode or the electronic control unit being in the second mode. With the bicycle controller according to the first aspect, in a case in which a rider walks and pushes the bicycle that includes the transmission device, the ratio of the rotational speed of the wheel to the rotational speed of the crank of the bicycle is changed to a ratio that is suitable for walking and pushing the bicycle.

In a second aspect of the invention, the bicycle controller according to the first aspect is configured so that the electronic control unit is configured to control the transmission device to decrease the ratio upon detection of the electronic control unit switching from the first mode to the second mode. With the bicycle controller according to the second aspect, situations in which the rotational torque of the wheel is insufficient for assisting movement of the bicycle while the rider walks and pushes the bicycle are reduced.

In a third aspect of the invention, the bicycle controller according to any one of the preceding aspects is configured so that the electronic control unit is configured to drive the motor and controls the transmission device to decrease the ratio upon detection of an operation device being operated to drive the motor while in the second mode. With the bicycle controller according to the third aspect, situations in which the rotational torque of the wheel is insufficient for assisting movement of the bicycle while the rider walks and pushes the bicycle are reduced. The transmission device is controlled at a timing at which the motor is driven. Thus, even if, for example, the transmission device includes a transmission device such as a derailleur that changes the ratio of the rotational speed of the wheel to the rotational speed of the crank as the crank rotates, the speed can be smoothly changed.

In a fourth aspect of the invention, the bicycle controller according to any one of the preceding aspects is configured so that the electronic control unit is configured to switch from the first mode to the second mode and then drive the motor and controls the transmission device to decrease the ratio upon detection of an operation device being operated to drive the motor while in the first mode. With the bicycle controller according to the fourth aspect, situations in which the rotational torque of the wheel is insufficient for assisting movement of the bicycle while the rider walks and pushes the bicycle are reduced. The transmission device is controlled at a timing at which the motor is driven. Thus, even if, for example, the transmission device includes a transmission device like a derailleur that changes the ratio of the rotational speed of the wheel to the rotational speed of the crank as the crank rotates, the speed can be smoothly changed.

In a fifth aspect of the invention, the bicycle controller according to any one of the preceding aspects is configured so that the electronic control unit is configured to control the transmission device to decrease the ratio upon detection of the electronic control unit switching from the second mode to the first mode. With the bicycle controller according to the fifth aspect, if the rider stops walking and pushing the bicycle and rides the bicycle using manual driving force, an increase in the load on the rider is limited at the point of time at which manual driving force starts to move the bicycle.

In a sixth aspect of the invention, the bicycle controller according to any one of the preceding aspects is configured so that the electronic control unit is configured to control the transmission device so that the ratio becomes less than or equal to a predetermined first ratio while in the second mode. With the bicycle controller according to the sixth aspect, situations in which the rotational torque of the wheel is insufficient for assisting movement of the bicycle are reduced.

In a seventh aspect of the invention, the bicycle controller according to any one of the preceding aspects is configured so that the electronic control unit is configured to drive the motor and controls the transmission device to increase the ratio upon detection of an operation device being operated to drive the motor while in the second mode. With the bicycle controller according to the seventh aspect, situations in which the speed of the bicycle driven by the motor becomes too low while the rider walks and pushes the bicycle are reduced. The transmission device is controlled at a timing at which the motor is driven. Thus, even if, for example, the transmission device includes a transmission device such as a derailleur that changes the ratio of the rotational speed of the wheel to the rotational speed of the crank as the crank rotates, the speed can be smoothly changed.

In an eighth aspect of the invention, the bicycle controller according to any one of the preceding aspects is configured so that the electronic control unit is configured to switch from the first mode to the second mode, drive the motor, and control the transmission device to increase the ratio upon detection of an operation device being operated to drive the motor while in the first mode. With the bicycle controller according to the eighth aspect, situations in which the speed of the bicycle driven by the motor becomes too low while the rider walks and pushes the bicycle are reduced. The transmission device is controlled at a timing at which the motor is driven. Thus, even if, for example, the transmission device includes a transmission device such as a derailleur that changes the ratio of the rotational speed of the wheel to the rotational speed of the crank as the crank rotates, the speed can be smoothly changed.

In a ninth aspect of the invention, the bicycle controller according to any one of the preceding aspects is configured so that the electronic control unit is configured to control the transmission device so that the ratio becomes less than or equal to a predetermined second ratio upon detection of an operation device being operated to stop the motor while in the second mode. With the bicycle controller according to the ninth aspect, if the rider stops walking and pushing the bicycle and rides the bicycle using manual driving force, an increase in the load on the rider is limited at the point of time at which manual driving force starts to move the bicycle.

In a tenth aspect of the invention, the bicycle controller according to any one of the preceding aspects is configured so that the electronic control unit is configured to control the transmission device in accordance with a vehicle speed of the bicycle in the second mode. With the bicycle controller according to the tenth aspect, the ratio of the rotational speed of the wheel to the rotational speed of the crank for a case in which the rider walks and pushes the bicycle can be adjusted to be in accordance with the vehicle speed. This reduces situations in which the rotational speed of the motor changes greatly while the pushing of the bicycle is assisted as the rider walks.

In an eleventh aspect of the invention, the bicycle controller according to any one of the preceding aspects is configured so that the electronic control unit is configured. to control the transmission device in accordance with a vehicle speed of the bicycle in the second mode, and the electronic control unit controls the transmission device to increase the ratio upon detection of the vehicle speed of the bicycle being less than or equal to a predetermined vehicle speed while in the second mode. With the bicycle controller according to the eleventh aspect, situations in which the speed of the bicycle driven by the motor becomes too low while being walked with the bicycle are reduced.

In a twelfth aspect of the invention, in the bicycle controller according to any one of the preceding aspects, the electronic control unit is configured to control the transmission device to decrease the ratio upon detection of an output torque of the motor becoming greater than or equal to a predetermined torque while in the second mode. With the bicycle controller according to the twelfth aspect, the rotational speed of the wheel relative to the rotational speed of the crank is decreased to reduce situations in which the output torque of the motor becomes greater than or equal to a predetermined torque in the second mode. This controls the output torque of the motor within a suitable range in the second mode and reduces situations in which the torque of the wheel is insufficient.

In a thirteenth aspect of the invention, the bicycle controller according to any one of the preceding aspects is configured so that the electronic control unit is configured to control a rotational speed of the motor in accordance with the ratio in the second mode. With the bicycle controller according to the thirteenth aspect, the bicycle can be controlled at a suitable speed in a case in which the rider walks and pushes the bicycle.

In a fourteenth aspect of the invention, a bicycle controller includes an electronic control unit that controls a transmission device, which is configured to change a ratio of a rotational speed of a wheel of a bicycle to a rotational speed of a crank of the bicycle, and a motor, which transmits torque to an upstream side of the transmission device in a transmission path of manual driving force that is input to the crank. The electronic control unit is configured to switch between a first mode that drives the motor in accordance with the manual driving force and a second mode that allows the motor to be driven to assist movement of the bicycle. The electronic control unit is configured to control a rotational speed of the motor in accordance with the ratio in the second mode. With the bicycle controller according to the fourteenth aspect, the bicycle can be controlled at a suitable speed in a case in which the rider walks and pushes the bicycle, and the bicycle can be moved in a preferred manner using the motor.

In a fifteenth aspect of the invention, the bicycle controller according to any one of the preceding aspects is configured so that if the transmission device changes the ratio, the electronic control unit is configured to control the rotational speed of the motor upon detection of the transmission device changing the ratio so that a difference between a vehicle speed of the bicycle before the ratio is changed and the vehicle speed of the bicycle after the ratio is changed is less than or equal to a predetermined value. With the bicycle controller according to the fifteenth aspect, changes are limited in the vehicle speed even if the transmission device changes the ratio of the rotational speed of the wheel of the bicycle to the rotational speed of the crank.

In a sixteenth aspect of the invention, the bicycle controller according to any one of the preceding aspects is configured so that the electronic control unit is configured to drive the motor upon determining the manual driving force is not being inputted to the crank while in the second mode. With the bicycle controller according to the sixteenth aspect, as long as the rider inputs manual driving force to the bicycle, the motor is not driven even in the second mode.

In a seventeenth aspect of the invention, the bicycle controller according to any one of the preceding aspects is configured so that the electronic control unit is configured to control the transmission device to increase the ratio on detection of slipping of the wheel while driving the motor while in the second mode. With the bicycle controller according to the seventeenth aspect, the torque of the wheel is decreased if slipping of the wheel is detected. This reduces slipping of the wheel.

In an eighteenth aspect of the invention, the bicycle controller according to any one of the preceding aspects is configured so that the electronic control unit is configured to decrease an output torque of the motor upon detection of slipping of the wheel while driving the motor while in the second mode. With the bicycle controller according to the eighteenth aspect, the torque of the wheel is decreased if slipping of the wheel is detected. This reduces slipping of the wheel.

In a nineteenth aspect of the invention, a bicycle control system includes the bicycle controller according to any one of the preceding aspects, and further comprises the transmission device and the motor. The transmission device includes an internal transmission device. With the bicycle control system according to the nineteenth aspect, the ratio of the rotational speed of the wheel to the rotational speed of the crank can be changed without driving the motor.

In a twentieth aspect of the invention, a bicycle control system includes the bicycle controller according to any one of the preceding aspects, and further comprises the transmission device and the motor. The transmission device includes a derailleur. With the bicycle control system according to the twentieth aspect, the ratio of the rotational speed of the wheel to the rotational speed of the crank can be changed by driving the motor and the derailleur.

In a twenty-first aspect of the invention, the bicycle controller according to any one of the preceding aspects further includes a clutch that interrupts transmission of rotation of the motor to the crank in a situation in which the bicycle moves forward. With the bicycle control system according to the twenty-first aspect, the crank restricts rotation of the crank while the rider walks and pushes the bicycle.

The present invention provides a bicycle controller and a bicycle control system for a bicycle including a transmission device that uses a motor in an optimal manner when the rider walks and pushes the bicycle.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings, It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
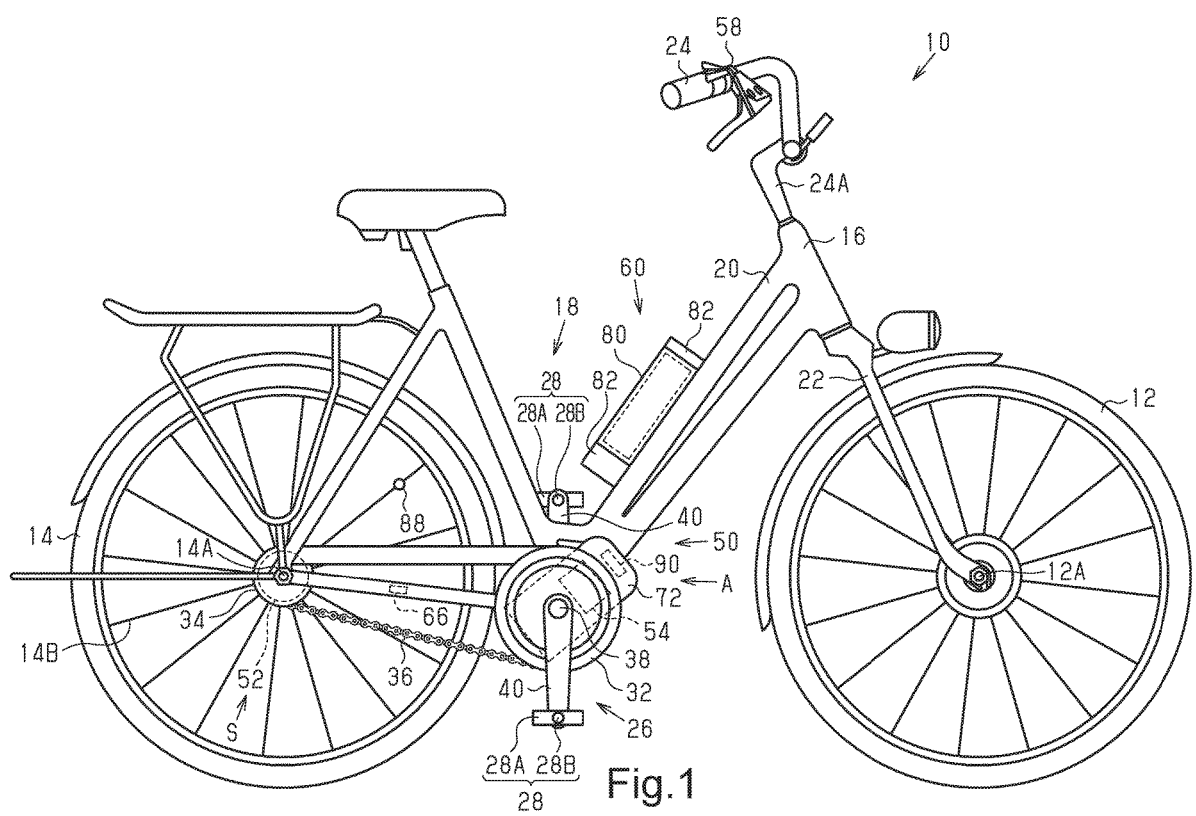
FIG. 1 is a side elevational view of a bicycle controller and a bicycle control system in accordance with a first embodiment.

A bicycle provided with a bicycle controller in accordance with a first embodiment and a bicycle control system including the bicycle controller will now be described with reference to FIGS. 1. to 6. As shown in FIG. 1, a bicycle 10 includes a front wheel 12, a rear wheel 14, a bicycle body 16, a drive mechanism 18 and a bicycle control system 50. The bicycle body 16 includes a frame 20, a front fork 22 connected to the frame 20, and a handlebar 24 connected in a removable manner by a stem 24A to the front fork 22. The front fork 22 is supported by the frame 20 and connected to an axle 12A of the front wheel 12.

A manual driving force TA is transmitted by the drive mechanism 18 to the rear wheel 14 to move the bicycle 10. The drive mechanism 18 includes a crank 26, two pedals 28, an output portion 30 (refer to FIG. 2), a front rotation body 32, a rear rotation body 34 and a chain 36.

The crank 26 incudes a crankshaft 38 and two crank arms 40. The crankshaft 38 is rotatably supported by a housing 72 of an assist device A that is coupled to the frame 20. The two crank arms 40 are coupled to the crankshaft 38. The two pedals 28 each include a pedal body 28A and a pedal shaft 28B. The pedal shaft 28B is coupled to the corresponding crank arm 40. The pedal body 28A is rotatably supported by the pedal shaft 28B.

The front rotation body 32 is coupled by the output portion 30 to the crankshaft 38. The front rotation body 32 is coaxial with the crankshaft 38. The rear wheel 14 includes a hub (not shown). In one example, the front rotation body 32 includes a front sprocket, and the rear rotation body 34 includes a rear sprocket. The chain 36 is wound around the front rotation body 32 and the rear rotation body 34. A manual driving force applied to the pedals 28 rotates the crank 26 in one direction. This manual driving force of the pedals 28 rotates the wheel 14 with the front rotation body 32, the chain 36, and the rear rotation body 34 in the same direction. In a further example, the front rotation body 32 includes a front pulley, and the rear rotation body 34 includes a rear pulley that is connected by a belt to the front rotation body 32. In another example, the front rotation body 32 includes a front bevel gear, and the rear rotation body 34 includes a rear bevel gear that is connected by a drive shaft to the front rotation body 32.

Figure 2:
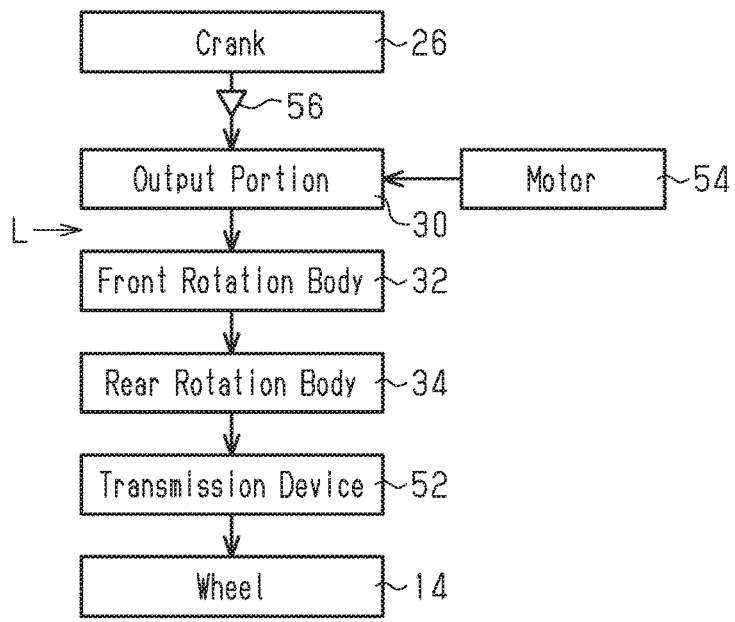
FIG. 2 is a schematic diagram of a manual driving force transmission path in a bicycle shown in FIG. 1.

As shown in FIG. 2, the crank 26, the output portion 30, the front rotation body 32, the rear rotation body 34, a transmission device 52 of the bicycle control system 50, and the wheel 14 form a transmission path for the manual driving force TA that is input to the crank 26.

Figure 3:
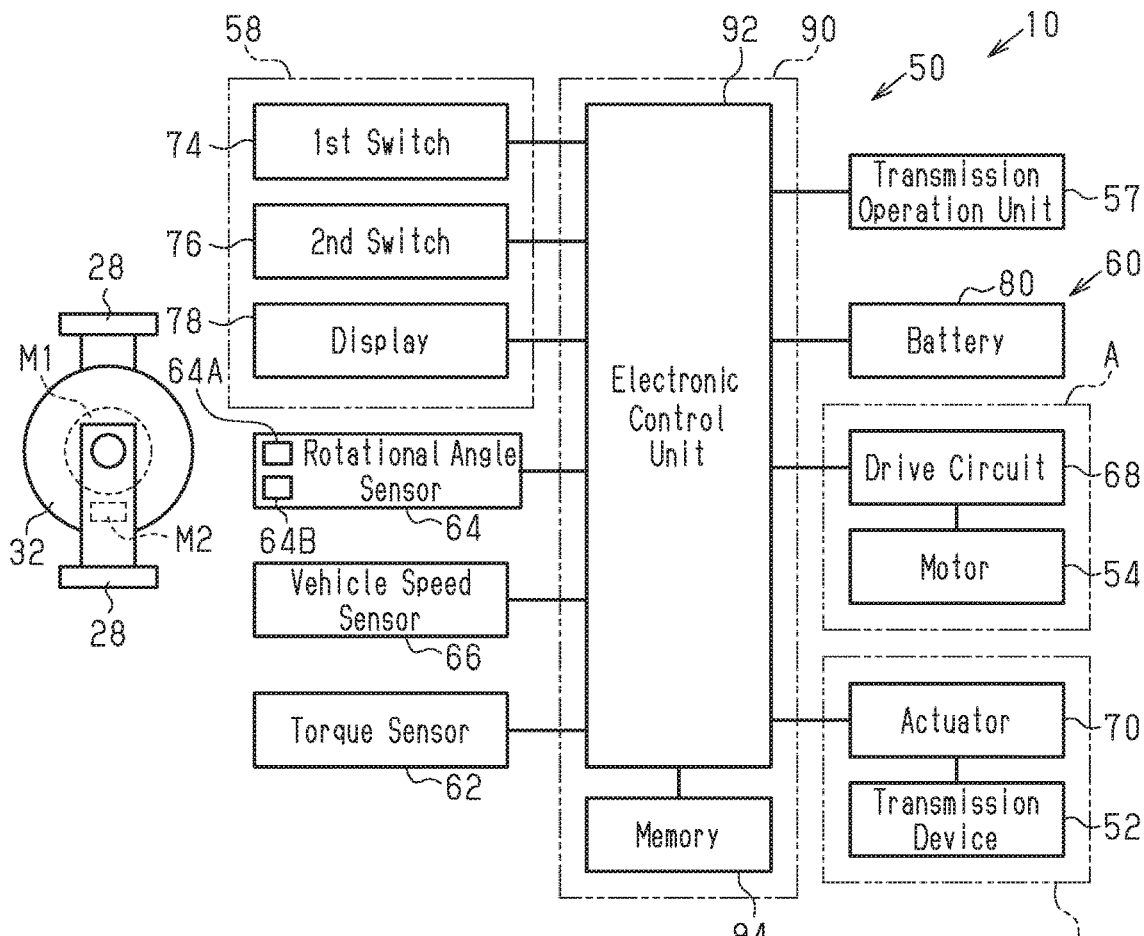
FIG. 3 is a block diagram showing the electrical configuration of the bicycle control system shown in FIG. 1.

As shown in FIG. 3, the bicycle control system 50 includes a bicycle controller 90, the transmission device 52 and a motor 54. In one example, the bicycle control system 50 includes a clutch 56 (refer to FIG. 2), a transmission operation unit 57, an operation device 58, a battery unit 60, a torque sensor 62, a rotational angle sensor 64 and a vehicle speed sensor 66.

As shown in FIG. 3, the transmission device 52 and an actuator 70 form a transmission apparatus S. The transmission device 52 is configured to change a ratio R of the rotational speed of the wheel 14 to a rotational speed N of the crank 26. The transmission device 52 is configured to change the ratio R in steps. In one example, the transmission device 52 changes the speed of the rotational input to the crankshaft 38 and transmits the rotation to the wheel 14. The transmission device 52 includes an internal transmission device. The internal transmission device is arranged in a hub of an axle 14A of the wheel 14 (refer to FIG. 1). The actuator 70 is an electric motor. The transmission device 52 is driven by the actuator 70 to perform speed-changing operations that change the ratio R in steps. The speed-changing operations include an operation for changing the connection of gears that form a planetary gear mechanism inside the transmission device 52. The internal transmission device can include a Continuously Variable Transmission (CVT) instead of the planetary gear mechanism. In one example, the CVT mechanism is formed by a planetary mechanism that includes an input body, an output body and a transmission body. The transmission body is rotated to continuously vary the ratio R. The transmission operation unit 57 is operable by a rider. The transmission operation unit 57 is attached to the handlebar 24 of the bicycle 10. The transmission operation unit 57 is configured to communicate with an electronic control unit 92 of the bicycle controller 90. The transmission operation unit 57 is configured to communicate with the electronic control unit 92 through a wire connection or a wireless connection. The transmission operation unit 57 is configured to communicate with the electronic control unit 92 through, for example, Power Line Communication (PLC). The rider operates the transmission operation unit 57. As a result, the transmission operation unit 57 transmits an output signal to the electronic control unit 92. The output signal can be a shift-up signal that increases the ratio R of the bicycle 10 or a shift-down signal that decreases the ratio R of the bicycle 10. The transmission operation unit includes, for example, an operation member, a sensor, and an electric circuit (none shown). The sensor detects movement of the operation member, and the electric circuit communicates with the electronic control unit 92 in accordance with the output signal of the sensor.

The motor 54 and a drive circuit 68 form the assist device A. The drive circuit 68 controls the power supplied from the battery unit 60 to the motor 54. The motor 54 assists the propulsion of the bicycle 10. The motor 54 includes an electric motor. The motor 54 transmits rotation to the transmission path L of the manual driving force TA from the pedals 28 to the wheel 14.

As shown in FIG. 2, the motor 54 transmits output torque TM of the motor 54 to the output portion 30. The power transmission path between the motor 54 and the crankshaft 38 includes the clutch 56 so that the rotation force of the crank 26 does not rotate the motor 54 in a case in which the crankshaft 38 rotates in the direction in which the bicycle 10 moves forward. The assist device A can include a structure other than the motor 54 and the drive circuit 68. For example, the assist device A can include a reduction gear that reduces the speed of the rotation produced by the motor 54 before outputting the rotation. In one example, the clutch 56 is located between the crank 26 and the output portion 30.

The transmission path L will now be described. The motor 54 transmits the output torque TM to the upstream side of the transmission device 52 in the transmission path L. The manual driving force TA input to the crank 26 is transmitted to the output portion 30. The output torque TM of the motor 54 is transmitted to the output portion 30. The manual driving force TA is combined with the output torque TM of the motor 54 at the output portion 30. The torque T combined at the output portion 30 is input via the front rotation body 32 and the rear rotation body 34 to the transmission device 52. The transmission device 52 changes the speed of the torque T with a predetermined gear and then outputs the torque T to the wheel 14. In a case in which the bicycle 10 moves forward, the clutch 56 interrupts transmission of the rotation produced by the motor 54 to the crank 26. In one example, the clutch 56 includes a one-way clutch. The clutch 56 can be omitted.

Figure 4:
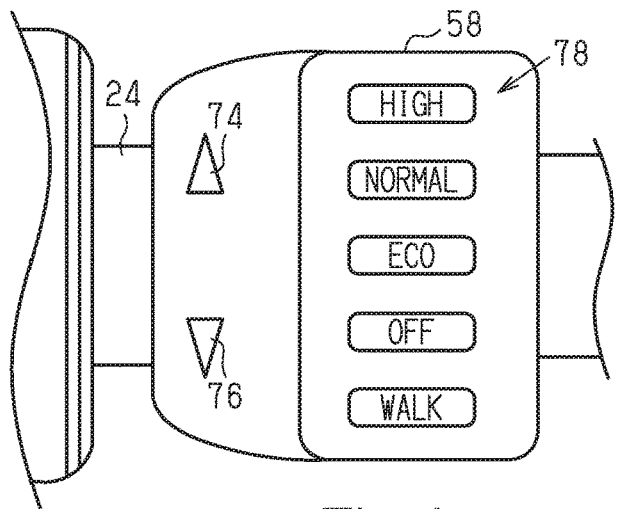
FIG. 4 is a front elevational view of an operation device of the bicycle control system shown in FIG. 1.

As shown in FIG. 4, the operation device 58 is attached to the handlebar 24. The operation device 58 is configured to communicate with the electronic control unit 92 of the bicycle controller 90 (refer to FIG. 3) through wire connection or wireless connection. The operation device 58 is configured to communicate with the electronic control unit 92 through, for example, PLC. The operation device 58 includes a first switch 74, a second switch 76 and a display 78. In a case in which the first switch 74 is operated, the operation device 58 transmits a first signal to the electronic control unit 92. In a case in which the second switch 76 is operated, the operation device 58 transmits a second signal to the electronic control unit 92. The display 78 shows operation modes of the motor 54. The operation mode includes a first mode and a second mode. The display 78 can be arranged independently from the operation device 58 or be omitted. The first switch 74 and the second switch 76 can each include, for example, a push-button switch. The first switch 74 and the second switch 76 can have any form as long as it is operable by the rider. At least one of the first switch 74 and the second switch 76 can be replaced by, for example, a lever.

As shown in FIG. 1, the battery unit 60 includes a battery 80 and a battery holder 82. The battery holder 82, which is fixed to the frame 20, holds the battery 80 in a removable manner. The battery 80 includes one or more battery cells. The battery 80 includes a rechargeable battery. The battery 80 supplies power to other electric components e.g., the motor 54, the actuator 70 and the bicycle controller 90) that are electrically connected by wires to the battery 80.

Referring to FIG. 3, the torque sensor 62 outputs a signal corresponding to the manual driving force TA. The torque sensor 62 detects the manual driving three TA applied to the crankshaft 38. The torque sensor 62 can be arranged anywhere between the crankshaft 38 and the front rotation body 32. For example, the torque sensor 62 can be arranged on the crankshaft 38 or the front rotation body 32 or on the crank arms 40 or the pedals 28. The torque sensor 62 can be realized using, for example, a strain gauge, a magnetostrictive sensor, an optical sensor, or a pressure sensor. Further, any sensor can be used as the torque sensor 62 as long as it outputs a signal that corresponds to the manual driving force TA applied to the crank arms 40 or the pedals 28.

The rotational angle sensor 64 detects a crank rotational angle CA. The rotational angle sensor 64 is attached to the frame 20 of the bicycle 10 or the housing 72 of the assist device A. The rotational angle sensor 64 includes a first element 64A that detects the magnetic field of a first magnet M1 and a second element 64B that outputs a signal corresponding to the positional relationship with a second magnet M2. The first magnet M1 is arranged on the crankshaft 38 or the crank arms 40 coaxially with the crankshaft 38. The first magnet M1 is an annular magnet, and has multiple magnetic poles that are alternately arranged in the circumferential direction. The first element 64A detects the rotational angle of the crank 26 relative to the frame 20. Whenever the crank 26 rotates once, the first element 64A outputs a signal of which single cycle is an angle obtained by dividing 360 degrees by the number of magnetic poles having the same polarity. The minimum value of the rotational angle of the crank 26 that is detectable by the rotational angle sensor 64 is 180 degrees or less, preferably, 15 degrees, and more preferably, 6 degrees. The second magnet M2 is arranged on the crankshaft 38 or the crank arms 40. The second element 64B detects a reference angle of the crank 26 relative to the frame (e.g., top dead center or bottom dead center of crank 26). The second element 64B outputs a signal of which single cycle is a single rotation of the crankshaft 38.

The rotational angle sensor 64 can be configured to include a magnetic sensor, which outputs a signal corresponding to the intensity of the magnetic field, instead of the first element 64A and the second element 64B. In this case, an annular magnet of which the intensity of the magnetic field changes in the circumferential direction is arranged in lieu of the first magnet M1 and the second magnet M2 on the crankshaft 38 coaxially with the crankshaft 38. The use of a magnetic sensor that outputs a signal corresponding to the intensity of the magnetic field allows a crank rotational speed CN and the rotational angle CA of the crank 26 to be detected with a single sensor. This simplifies the structure and facilitates assembling. In addition to the crank rotational angle CA, the rotational angle sensor 64 can detect a crank rotational speed N. The crank rotational speed N can be detected using any one of the output of the first element 64A, the output of the second element 64B, and the output of the magnetic sensor. The rotational angle sensor 64 can be omitted.

The vehicle speed sensor 66 is electrically connected to the electronic control unit 92 through a wire connection or a wireless connection. The vehicle speed sensor 66 is attached to a chain stay of the frame 20 shown in FIG. 1. The vehicle speed sensor 66 outputs a signal to the electronic control unit 92 that corresponds to changes in the position relative to a magnet 88 attached to a spoke 14B of the rear wheel 14. It is preferred that the vehicle speed sensor 66 include a magnetic reed, which forms a reed switch, or a Hall element.

The bicycle controller 90 includes the electronic control unit 92. In one example, it is further preferred that the bicycle controller 90 include a memory 94 (i.e., computer data storage device). The electronic control unit 92 includes an arithmetic processing unit that executes predetermined control programs. The arithmetic processing unit can include, for example, a Central Processing Unit (CPU) or a Micro Processing Unit (MPU). The electronic control unit 92 can include one or more microcomputers. The memory 94 stores information used for various types of control programs and various types of control processes. The memory 94 includes, for example, a non-volatile memory and a volatile memory.

The electronic control unit 92 controls the transmission device 52 and the motor 54. The electronic control unit 92 is configured to be switched between a first mode and a second mode. In the first mode, the electronic control unit 92 is configured to drive the motor 54 in accordance with the manual driving force TA. The first mode includes multiple assist modes and an off mode. The ratio of the output of the motor 54 to the manual driving force TA (hereinafter referred to as "the assist ratio") differs in each assist mode. The motor 54 is not driven in the off mode. In a case in which the first switch 74 of the operation device 58 is operated in the off mode, the electronic control unit 92 switches to the assist mode having the lowest assist ratio. In a case in which the first switch 74 of the operation device 58 is operated with the electronic control unit 92 in an assist mode, the electronic control unit 92 switches to the mode having the assist ratio that is one stage higher. In a case in which the first switch 74 of the operation device 58 is operated with the electronic control unit 92 in the assist mode having the highest assist ratio, the electronic control unit 92 remains in the assist mode having the highest assist ratio. In a case in which the second switch 76 of the operation device 58 is operated in the off mode, the electronic control unit 92 switches from the first mode to the second mode. In a case in which the second switch 76 of the operation device 58 is operated with the electronic control unit 92 in an assist mode, the electronic control unit 92 switches to the mode having the assist ratio that is one stage lower. In a case in which the second switch 76 of the operation device 58 is operated with the electronic control unit 92 in the assist mode having the lowest assist ratio, the electronic control unit 92 switches to the off mode. The first mode can be configured to include one assist mode and an off mode or include only one assist mode.

In the second mode, the electronic control unit 92 is configured to drive the motor 54 and assist movement of the bicycle 10 while a rider walks and pushes the bicycle 10. The second mode includes a standby mode that does not drive the motor 54 and a drive mode that drives the motor 54. When shifted from the first mode to the second mode, the electronic control unit 92 enters the standby mode. In a case in which the second switch 76 is operated in the standby mode, the electronic control unit 92 switches from the standby mode to the drive mode. As long as there is no need to stop driving the motor 54 in accordance with inputs from the sensor or as long as the first switch 74 or the transmission operation unit 57 is not operated, continuous pushing of the second switch 76 in the second mode maintains the drive mode and drives the motor 54. In a state in which the second switch 76 is being operated to maintain the drive mode, by releasing the second switch 76, the electronic control unit 92 switches from the drive mode to the standby mode. In a state in which the second switch 76 is being operated to maintain the drive mode, if there is a need to stop the motor 54 in accordance with inputs from sensors or if the first switch 74 or the transmission operation unit 57 is operated, then the electronic control unit 92 switches from the drive mode to the standby mode. In a case in which the drive mode is switched to the standby mode by operating the second switch 76, the electronic control unit 92 can be switched again from the standby mode to the drive mode by releasing the second switch 76 and then operating the second switch 76 again.

The electronic control unit 92 is configured to control the transmission device 52 and change the ratio R in order to switch between the first mode and the second mode. To switch from the first mode to the second mode, the electronic control unit 92 controls the transmission device 52 to decrease the ratio R. In the second mode, the electronic control unit 92 controls the transmission device 52 so that the ratio R becomes less than or equal to a predetermined first ratio R1. In a case in which the operation device 58 is operated to stop the motor in the second mode, the electronic control unit 92 controls the transmission device 52 so that the ratio R becomes less than or equal to a predetermined second ratio R2. The electronic control unit 92 is configured to drive the motor 54 during the second mode in a case in which the manual driving force TA is not input to the crank 26.

Figure 5:
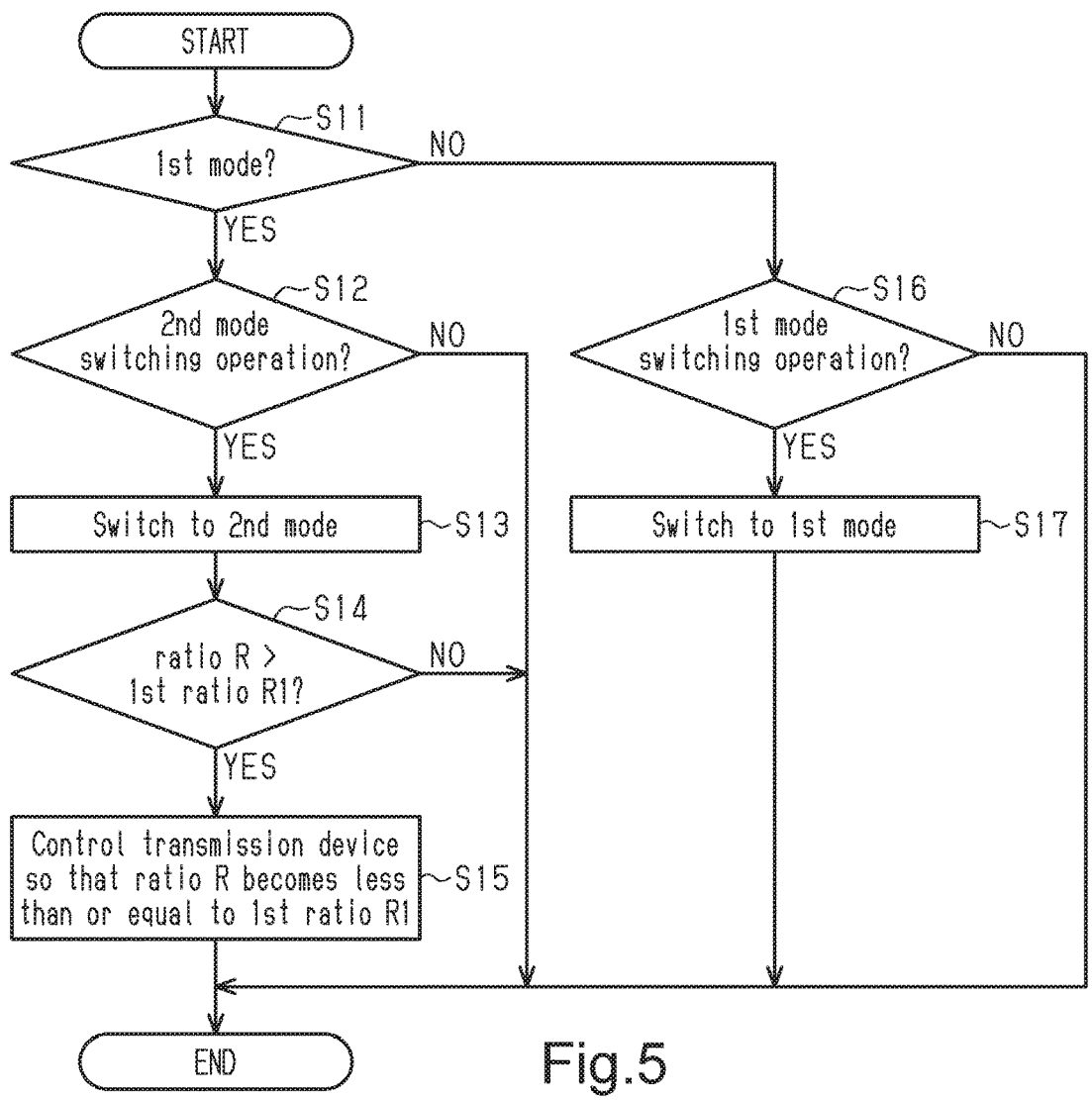
FIG. 5 is a flowchart of a switching control executed by an electronic control unit shown in FIG. 1.

A switching control for switching between the first mode and the second mode will now be described with reference to FIG. 5. The electronic control unit 92 executes the switching control in predetermined cycles as long as the bicycle controller 90 is supplied with power. If the supply of power is cut, then the bicycle controller 90 stops executing the switching control.

In step S11, the electronic control unit 92 determines whether or not the present mode is the first mode. If the electronic control unit 92 determines that the present mode is the first mode in step S11, then the electronic control unit 92 proceeds to step S12.

In step S12, the electronic control unit 92 determines whether or not an operation for switching to the second mode has been performed. More specifically, in the off mode of the first mode, the electronic control unit 92 determines that an operation for switching to the second mode has been performed if the second switch 76 of the operation device 58 is operated. The electronic control unit 92 can also determine that an operation for switching to the second mode has been performed during an assist mode in the first mode if the second switch 76 of the operation device 58 is operated or the second switch 76 of the operation device 58 is operated for a predetermined time or longer.

If the electronic control unit 92 determines that an operation for switching to the second mode has not been performed, then the electronic control unit 92 terminates the processing and restarts the processing after a predetermined cycle from step S11. If the electronic control unit 92 determines that an operation for switching to the second mode has been performed, then the electronic control unit 92 proceeds to step S13 and switches from the first mode to the second mode. Then, the electronic control unit 92 proceeds to step S14.

In step S14, the electronic control unit 92 determines whether or not the ratio R is greater than the first ratio R1. If the electronic control unit 92 determines in step S14 that the ratio R is less than or equal to the first ratio R, then the electronic control unit 92 terminates the processing and restarts the processing after a predetermined cycle from step S11. If the electronic control unit 92 determines that the ratio R is greater than the first ratio R1, in step S15, then the electronic control unit 92 controls the transmission device 52 so that the ratio R becomes less than or equal to the first ratio R1. Then, the electronic control unit 92 terminates the processing and restarts the processing after a predetermined cycle from step S11. In one example, the electronic control unit 92 in step S15 controls the transmission device 52 so that the ratio R becomes equal to the first ratio R1. As long as the first ratio R1 is not the minimum ratio R that can be realized by the transmission device 52, the electronic control unit 92 can decrease the ratio R to be smaller than the first ratio R1.

If the electronic control unit 92 determines in step S11 that the present mode is not the first mode, that is, the present mode is the second mode, then the electronic control unit 92 proceeds to step S16 and determines whether or not an operation for switching to the first mode has been performed. More specifically, in the standby mode of the second mode, the electronic control unit 92 determines that an operation for switching to the first mode has been performed if the first switch 74 of the operation device 58 is operated. In the drive mode of the second mode, the electronic control unit 92 can determine that an operation for switching to the first mode has been performed if the first switch 74 of the operation device 58 is operated or if the first switch 74 of the operation device 58 is operated for a predetermined time or longer. When the electronic control unit 92 determines that an operation for switching to the first mode has not been performed, the electronic control unit 92 terminates the processing and restarts the processing after a predetermined cycle from step S11. If the electronic control unit 92 determines that an operation for switching to the first mode has been performed, in step S17, then the electronic control unit 92 switches from the second mode to the first mode. Then, the electronic control unit 92 terminates the processing and restarts the processing after a predetermined cycle from step S11.

Figure 6:
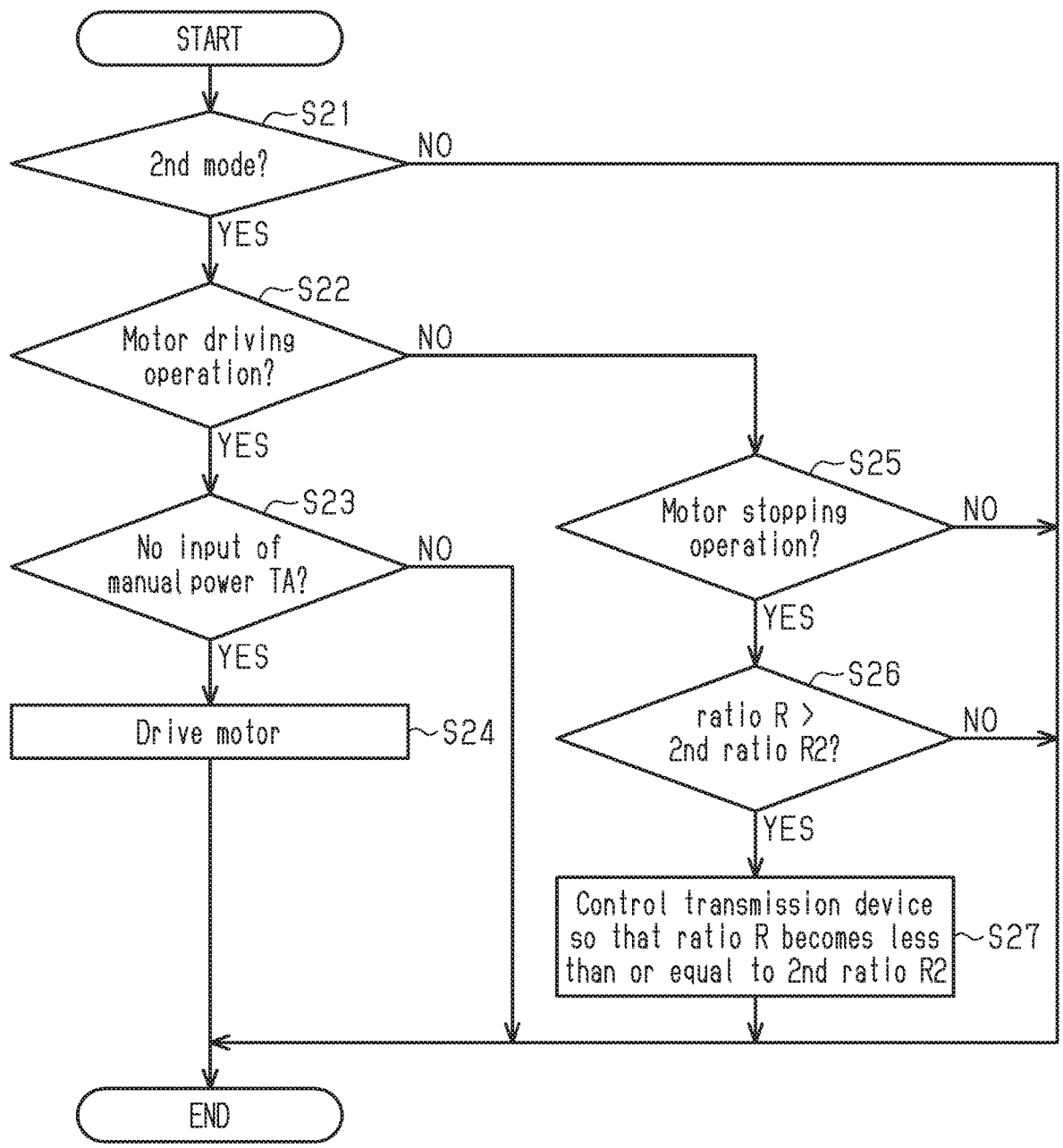
FIG. 6 is a flowchart of a drive control executed by the electronic control unit shown in FIG. 1.

A drive control of the motor 54 in the second mode will now be described with reference to FIG. 6. The electronic control unit 92 executes the drive control in predetermined cycles as long as the bicycle controller 90 is supplied with power. If the supply of power is cut, then the bicycle controller 90 stops executing the drive control.

In step S21, the electronic control unit 92 determines whether or not the present mode is the second mode. If the electronic control unit 92 determines that the present mode is the second mode, in step S22, the electronic control unit 92 determines whether or not an operation for driving the motor 54 has been performed. More specifically, if the second switch 76 has been operated in the standby state, then the electronic control unit 92 determines that an operation for driving the motor 54 has been performed.

If the electronic control unit 92 determines in step S22 that an operation for driving the motor 54 has been performed, then the electronic control unit 92 proceeds to step S23 and determines whether or not there is no input of the manual driving force TA. More specifically, the electronic control unit 92 determines that the manual driving force TA is not being inputted when the manual driving force TA detected by the torque sensor 62 is less than or equal to a determination value TX. Preferably, the determination value TX is "0." If the electronic control unit 92 determines in step S23 that the manual driving force TA is being input, then the electronic control unit 92 does not drive the motor 54 and restarts the processing after a predetermined cycle from step S21. If the electronic control unit 92 determines that the manual driving force TA is not being inputted, then the electronic control unit 92 proceeds to step S24 and drives the motor 54. The electronic control unit 92 then restarts the processing after a predetermined cycle from step S21.

If the electronic control unit 92 determines in step S22 that an operation for driving the motor 54 has not been performed, then the electronic control unit 92 proceeds to step S25. More specifically, the electronic control unit 92 determines that an operation for driving the motor 54 has not been performed if the second switch 76 has not been operated. In step S25, the electronic control unit 92 determines whether or not a stopping operation has been performed on the motor 54. In one example, the stopping operation includes releasing the second switch 76. More specifically, the electronic control unit 92 determines that a stopping operation has been performed on the motor 54 if the second switch 76 was operated in the previous drive control cycle but not in the present drive control cycle. If the electronic control unit 92 determines that a stopping operation has not been performed on the motor 54, then the electronic control unit 92 terminates the processing and restarts the processing after a predetermined cycle from step S21. If the electronic control unit 92 determines that a stopping operation has been performed on the motor 54, then the electronic control unit 92 proceeds to step S26.

In step S26, the electronic control unit 92 determines whether or not the ratio R is greater than the second ratio R2. If the electronic control unit 92 determines that the ratio R is less than or equal to the second ratio R2, then the electronic control unit 92 terminates the processing and restarts the processing after a predetermined cycle from step S21. If the electronic control unit 92 determines that the ratio R is greater than the second ratio R2, then the electronic control unit 92 proceeds to step S27 and controls the transmission device 52 so that the ratio R becomes less than or equal to the second ratio R2 and restarts the processing after a predetermined cycle from step S21. Preferably, the electronic control unit 92 controls the transmission device 52 in step S27 so that the ratio R becomes equal to the second ratio R2. When the second ratio R2 is not the minimum ratio R that can be realized by the transmission device 52, the electronic control unit 92 can decrease the ratio R to be smaller than the second ratio R2. The second ratio R2 can be equal to or different from the first ratio R1.

In the drive control of the first embodiment, steps S25 to S27 can be omitted. If steps S25 to S27 are omitted and the electronic control unit 92 determines in step S22 that an operation for driving the motor 54 has not been performed, the electronic control unit 92 terminates the processing.

Second Embodiment

Figure 7:
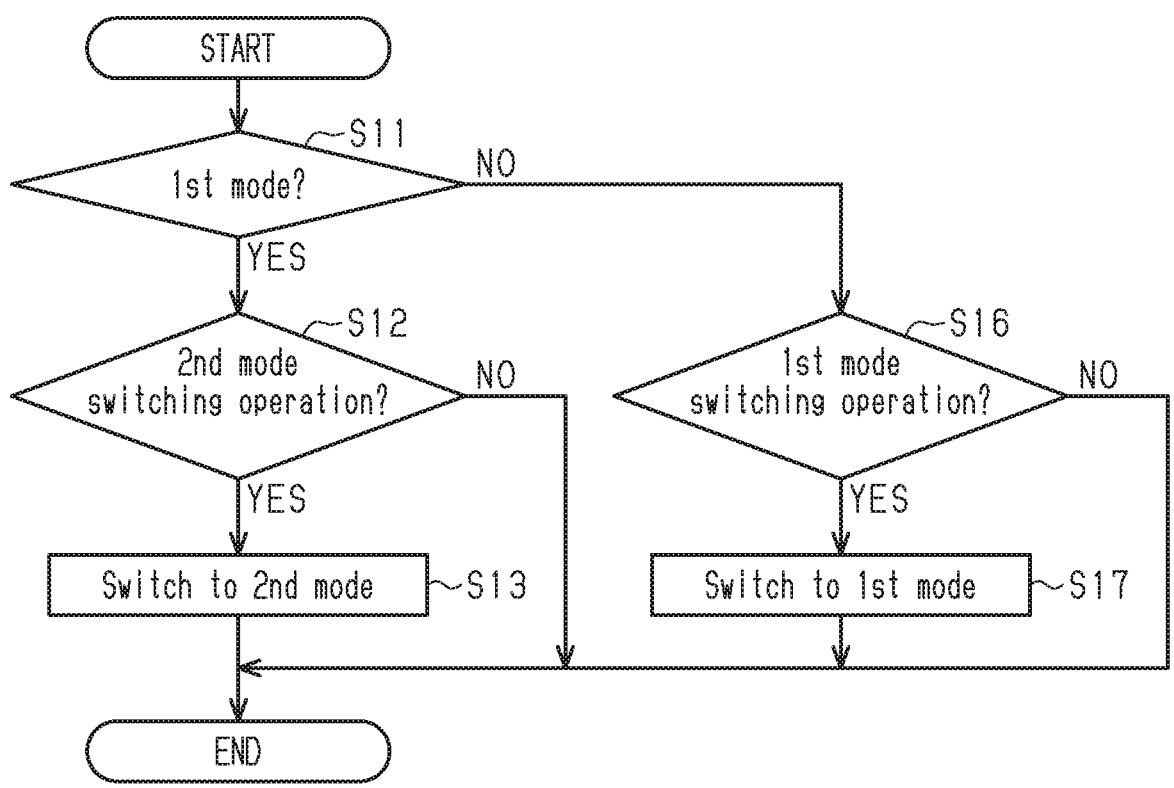
FIG. 7 is a flowchart of a switching control executed by the electronic control unit in accordance with a second embodiment.

The bicycle controller 90 of a second embodiment will now be described with reference to FIGS. 3, 7 and 8. The bicycle controller 90 of the second embodiment only differs from the bicycle controller 90 of the first embodiment in the processing executed by the electronic control unit 92. Same reference numerals are given to those elements that are the same as the corresponding elements of the first embodiment. Such elements will not be described below. The second embodiment differs from the first embodiment in the conditions for changing the ratio R in the second mode.

The electronic control unit 92 is configured to change the ratio R by controlling the transmission device 52. When an operation for driving the motor 54 is performed on the operation device 58 in the second mode, the electronic control unit 92 drives the motor 54 and controls the transmission device. 52 to decrease the ratio R.

The switching control of the second embodiment will now be described with reference to FIG. 7. In the switching control of the second embodiment, steps S14 an S15 are omitted from the switching control flowchart of FIG. 5. Steps S11, S12, S13, S16 and S17 of the switching control in the second embodiment are processes that are respectively identical to steps S11, S12, S13, S16 and S17 of the switching control in the first embodiment shown in FIG. 5 and executed in the same order.

If the electronic control unit 92 determines in step S12 that an operation for switching to the second mode has been performed, then the electronic control unit 92 proceeds to step S13 and switches from the first mode to the second mode. Then, the electronic control unit 92 terminates the processing and restarts the processing after a predetermined cycle from step S11.

A drive control in the second mode will now be described with reference to FIG. 8. In the drive control of the second embodiment, step S14 or steps S14 and S15 are performed after step S24. Steps S21, S22, S23, S24, S25, S26 and S27 of the drive control in the second embodiment are processes that are respectively identical to steps S21, S22, S23, S24, S25, S26 and S27 of the drive control in the first embodiment shown in FIG. 6 and executed in the same order.

In step S24, the electronic control unit 92 drives the motor 54 and then proceeds to step S14. The electronic control unit 92 in step S14 determines whether or not the ratio R is greater than the first ratio R1. If the electronic control unit 92 determines that the ratio R is less than or equal to the first ratio R1, then the electronic control unit 92 terminates the processing and restarts the processing after a predetermined cycle from step S21. If the electronic control unit 92 determines that the ratio R is greater than the first ratio R1, then the electronic control unit 92 proceeds to step S15 and controls the transmission device 52 so that the ratio R becomes less than or equal to the first ratio R1. Then, the electronic control unit 92 terminates the processing and restarts the processing after a predetermined cycle from step S11.

In the drive control of the second embodiment, steps S25 to S27 or steps S14 and S15 can be omitted. If steps S25 to S27 are omitted and the electronic control unit 92 determines in step S22 that an operation for driving the motor 54 has not been performed, the electronic control unit 92 terminates the processing.

Third Embodiment

The bicycle controller 90 of a third embodiment will now be described with reference to FIGS. 3 and 9. The bicycle controller 90 of the third embodiment differs from the bicycle controller 90 of the second embodiment only in the processing executed by the electronic control unit 92. Same reference numerals are given to those elements that are the same as the corresponding elements of the second embodiment. Such elements will not be described below. The third embodiment differs from the second embodiment in the conditions for changing the ratio R in the second mode.

If the output torque TM of the motor 54 becomes greater than or equal to a predetermined torque TMX in the second mode, the electronic control unit 92 controls the transmission device 52 to decrease the ratio R. The electronic control unit 92 controls the rotational speed N of the motor 54 in accordance with the ratio R in the second mode. To change the ratio R with the transmission device 52, the electronic control unit 92 controls the rotational speed N of the motor 54 so that the difference between a vehicle speed V before changing the ratio R and the vehicle speed V after changing the ratio R becomes less than or equal to a predetermined value DV. The electronic control unit 92 controls the rotational speed N of the motor 54 in accordance with the ratio R in the second mode.

A drive control in the second mode will now be described with reference to FIG. 9. The electronic control unit 92 executes the drive control in predetermined cycles as long as the bicycle controller 90 is supplied with power. If the supply of power is cut, the bicycle controller 90 stops executing the drive control.

Figure 8:
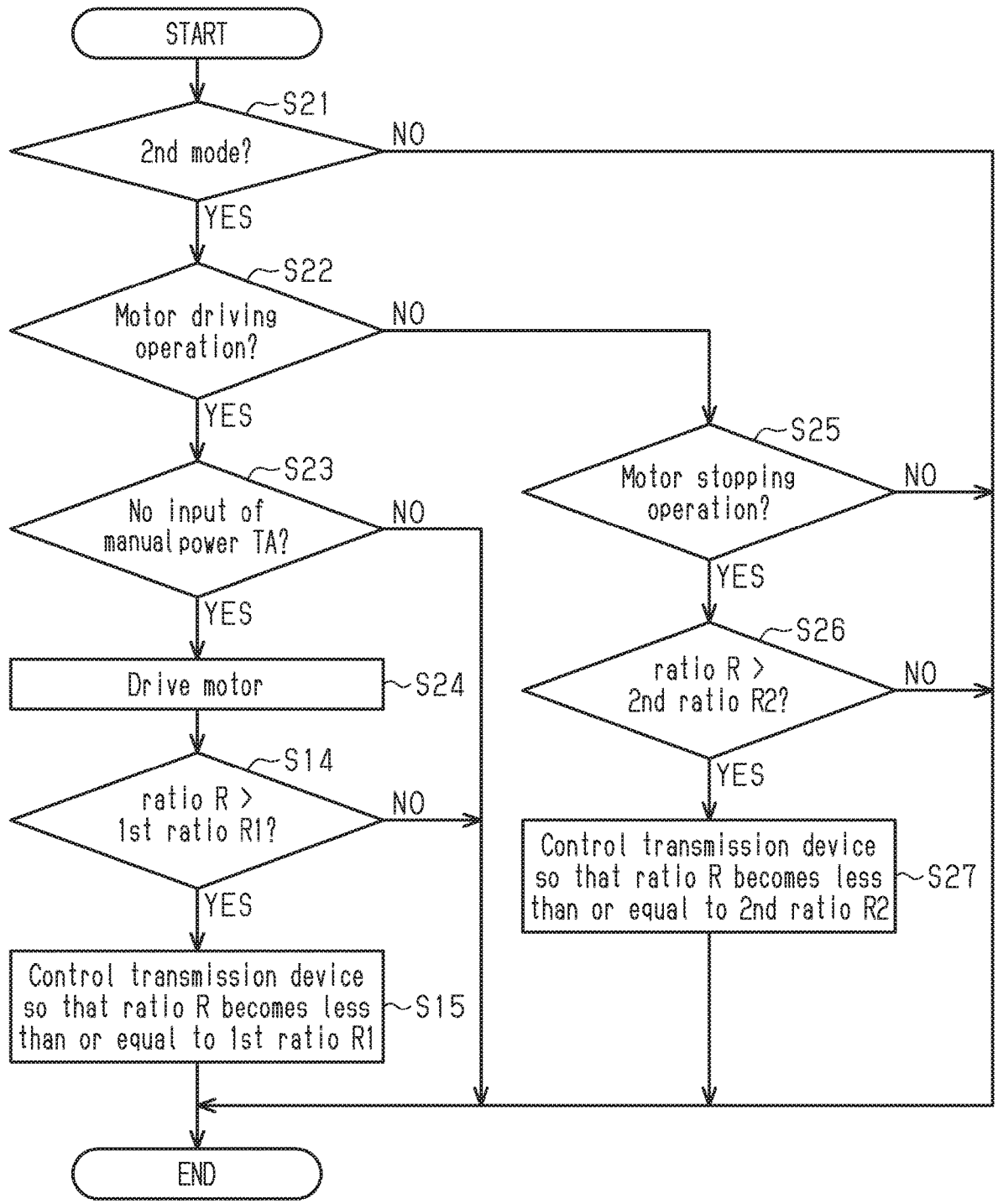
FIG. 8 is a flowchart of a drive control executed by the electronic control unit in accordance with the second embodiment.

Steps S21, S22, S23, S24, S25, S26 and S27 of the drive control in the third embodiment are respectively identical to steps S21, S22, S23, S24, S25, S26 and S27 of the drive control in the second embodiment shown in FIG. 8 and executed in the same order.

In step S24, if the electronic control unit 92 drives the motor 54, then the electronic control unit 92 proceeds to step S31 and determines whether or not the output torque TM of the motor 54 is greater than or equal to the predetermined torque TMX. If the electronic control unit 92 determines that the output torque TM of the motor 54 is less than the predetermined torque TMX, then the electronic control unit 92 terminates the processing and restarts the processing after a predetermined cycle from step S21. The electronic control unit 92 detects the output torque TM of the motor 54 from a command that operates the motor 54 or from the current flowing to the motor 54. If the electronic control unit 92 determines in step S31 that the output torque TM of the motor 54 is greater than or equal to the predetermined torque TMX, then the electronic control unit 92 proceeds to step S14 and determines whether or not the ratio R is greater than the first ratio R1. If the electronic control unit 92 determines that the ratio R is less than or equal to the first ratio R1, then the electronic control unit 92 terminates the processing and restarts the processing after a predetermined cycle from step S21. if the electronic control unit 92 determines that the ratio R is greater than the first ratio R1, then the electronic control unit 92 proceeds to step S15 and controls the transmission device 52 so that the ratio R becomes less than or equal to the first ratio R1. Then, the electronic control unit 92 proceeds to step S32.

In step S32, the electronic control unit 92 controls the rotational speed N of the motor 54 in accordance with the ratio R. More specifically, the electronic control unit 92 controls the rotational speed N of the motor 54 so that the difference between the vehicle speed V before the ratio R was changed and the vehicle speed V after the ratio R was changed becomes lower than or equal to the predetermined value DV. The memory 94 of the present embodiment stores in advance a map or a table showing the relationship of the ratio R and the rotational speed N. The electronic control unit 92 controls the rotational speed N of the motor 54 based on the map or table stored in the memory 94. The memory 94 can store a function instead of the map or table. The relationship of the ratio R and the rotational speed N is set so that the rotational speed N increases as the ratio R decreases. The relationship of the ratio R and the rotational speed N is set so that the rotational speed of the wheel 14 falls within a predetermined range or becomes constant. In a case in which the rotational speed N of the motor 54 is constant, a decrease in the ratio R will decrease the rotational speed of the wheel 14. Thus, if the electronic control unit 92 decreases the ratio R, then the electronic control unit 92 will increase the rotational speed N of the motor 54 so that the rotational speed of the wheel 14 approaches the rotational speed before the ratio R was changed for the difference between the vehicle speed V before the ratio R was changed and the vehicle speed V after the ratio R was changed to become less than or equal to the predetermined value DV. If the electronic control unit 92 increases the ratio R, the electronic control unit 92 will decrease the rotational speed N of the motor 54 so that the rotational speed of the wheel 14 approaches the rotational speed before the ratio R was changed in for the difference between the vehicle speed V before the ratio R was changed and the vehicle speed V after the ratio R was changed to become less than or equal to the predetermined value DV. After processing step S32, the electronic control unit 92 restarts the processing after a predetermined cycle from step S21. Instead of the relationship between the ratio R and the rotational speed N, the memory 94 can store the relationship between the gears and the rotational speed N. In this case, the memory 94 stores the motor rotational speed N corresponding to each gear. One of steps S31 and S32 can be omitted from the drive control in the third embodiment.

Fourth Embodiment

The bicycle controller 90 of a fourth embodiment will now be described with reference to FIGS. 3 and 10. The bicycle controller 90 of the fourth embodiment basically differs from the bicycle controller 90 of the first embodiment in the processing executed by the electronic control unit 92. Same reference numerals are given to those elements that are the same as the corresponding elements of the first embodiment. Such elements will not be described below. In the fourth embodiment, the electronic control unit 92 executes the switching-drive control shown in FIG. 10 instead of the switching control shown in FIG. 5 and the drive control shown in FIG. 6.

If an operation for driving the motor 54 is performed on the operation device 58 in the first mode, then the electronic control unit 92 switches from the first mode to the second mode to drive the motor 54 and control the transmission device 52 in order to decrease the ratio R. If the electronic control unit 92 switches from the second mode to the first mode, then the electronic control unit 92 controls the transmission device 52 to decrease the ratio R. The operation for driving the motor 54 includes, for example, operating one of the first switch 74 and the second switch 76 of the operation device 58 for a predetermined time or longer. In addition to or instead of the first switch 74 and the second switch 76, the operation device 58 can include a third switch (not shown). In this case, the operation for driving the motor 54 can include, for example, operating the third switch of the operation device 58.

The switching-drive control that switches the first mode and the second mode and drives the motor 54 will now be described with reference to FIG. 10. The electronic control unit 92 executes the switching-drive control in predetermined cycles as long as the bicycle controller 90 is supplied with power. If the supply of power is cut, the bicycle controller 90 stops executing the switching-drive control.

In step S41, the electronic control unit 92 determines whether or not the present mode is the first mode. If the electronic control unit 92 determines that the present mode is not the first mode, then the electronic control unit 92 terminates the processing and restarts the processing after a predetermined cycle from step S41. If the electronic control unit 92 determines in step S41 that the present mode is the first mode, then the electronic control unit 92 proceeds to step S42.

In step S42, the electronic control unit 92 determines whether or not an operation for driving the motor 54 has been performed. If the electronic control unit 92 determines in step S42 that an operation for driving the motor 54 has not been performed, then the electronic control unit 92 terminates the processing and restarts the processing after a predetermined cycle from step S41. If the electronic control unit 92 determines in step S42 that an operation for driving the motor 54 has been performed, then the electronic control unit 92 proceeds to step S43 and switches from the first mode to the second mode. Then, the electronic control unit 92 proceeds to step S44. The electronic control unit 92 determines that an operation for driving the motor 54 has been performed if the first switch 74 or the second switch 76 of the operation device 58 is operated for a predetermined time or long or if the third switch is operated. In step S44, the electronic control unit 92 determines whether or not there is no input of the manual driving force TA. If the electronic control unit 92 determines in step S44 that the manual driving force TA is being input, the electronic control unit 92 proceeds to step S48 without controlling the motor 54 and the transmission device 52. If the electronic control unit 92 determines in step S44 that the manual driving force TA is not being inputted, then the electronic control unit 92 proceeds to step S45 and drives the motor 54. Then, the electronic control unit 92 proceeds to step S46.

In step S46, the electronic control unit 92 determines whether or not the ratio R is greater than the first ratio R1. When the electronic control unit 92 determines in step S46 that the ratio R is less than or equal to the first ratio R1, the electronic control unit 92 proceeds to step S48 without controlling the transmission device 52. If the electronic control unit 92 determines in step S46 that the ratio R is greater than the first ratio R1, then the electronic control unit 92 proceeds to step S47. In step S47, the electronic control unit 92 controls the transmission device 52 so that the ratio R becomes less than or equal to the first ratio R1. Then, the electronic control unit 92 proceeds to step S48.

The electronic control unit 92 determines in step S48 whether or not an operation for stopping the motor 54 has been performed. The electronic control unit 92 determines that an operation for stopping the motor 54 has been performed if the first switch 74 or the second switch 76, which has been operated for a predetermined time or longer, is released or if the third switch is released. If the electronic control unit 92 determines that an operation for stopping the motor 54 has not been performed, then the electronic control unit 92 executes the processes of steps S44 to S47 again. That is, the electronic control unit 92 continues to drive the motor 54 in accordance with the manual driving force TA until an operation for stopping the motor 54 is performed.

If the electronic control unit 92 determines in step S48 that an operation for stopping the motor 54 has been performed, then the electronic control unit 92 proceeds to step S49 and switches from the second mode to the first mode. Then, the electronic control unit 92 proceeds to step S50 and determines whether or not the ratio R is greater than the second ratio R2. If the electronic control unit 92 determines that the ratio R is less than or equal to the second ratio R, then the electronic control unit 92 terminates the processing and restarts the processing after a predetermined cycle from step S41. If the electronic control unit 92 determines that the ratio R is greater than the second ratio R2, the electronic control unit 92 proceeds to step S51 and controls the transmission device 52 so that the ratio R becomes less than or equal to the second ratio R2 and restarts the processing after a predetermined cycle from step S41. In the fourth embodiment, the electronic control unit 920 is able to immediately shift to the second mode and drive the motor 54 from any assist mode. Step S44 can be omitted from the switching-drive control of the fourth embodiment. Further, steps S46 and S47 or steps S50 and S51 can be omitted from the switching-drive control of the fourth embodiment.

Fifth Embodiment

Figure 11:
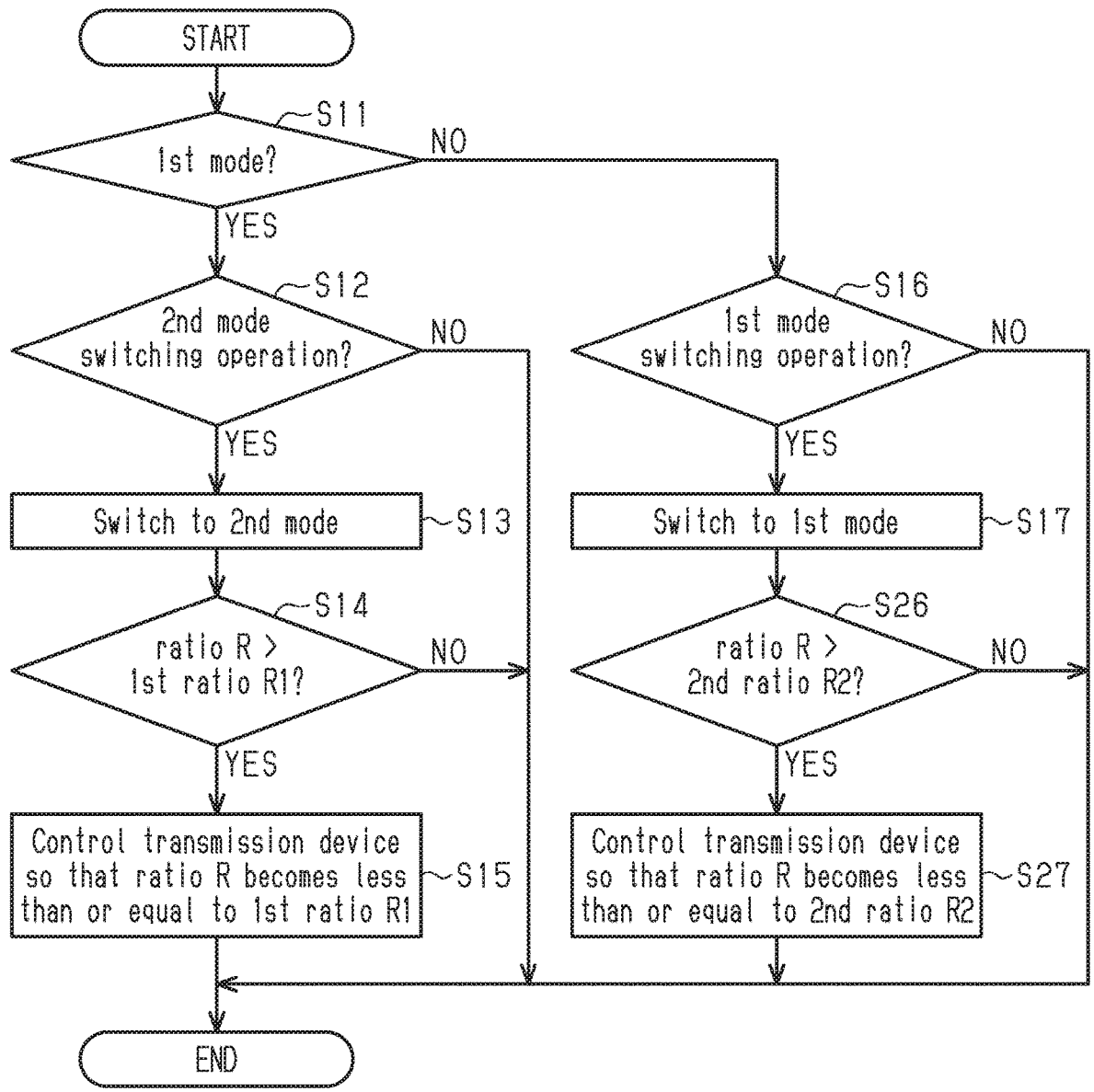
FIG. 11 is a flowchart of a switching control executed by the electronic control unit in accordance with a fifth embodiment.
Figure 12:
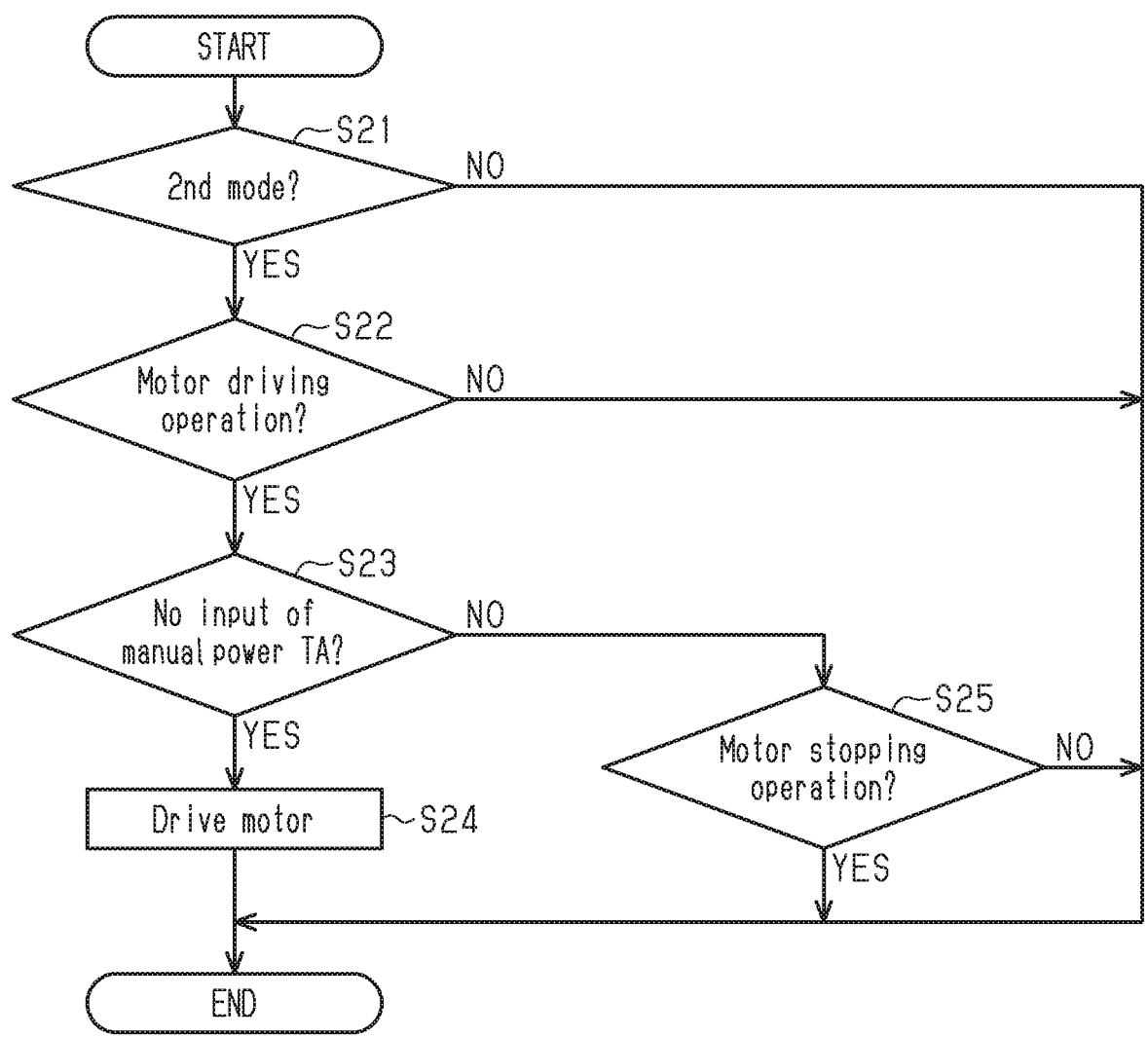
FIG. 12 is a flowchart of a drive control executed by the electronic control unit in the fifth embodiment.

The bicycle controller 90 of a fifth embodiment will now be described with reference to FIGS. 3, 11, and 12. The bicycle controller 90 of the fifth embodiment differs from the bicycle controller 90 of the first embodiment in the processing executed by the electronic control unit 92. Same reference numerals are given to those elements that are the same as the corresponding elements of the first embodiment. Such elements will not be described below. In the fifth embodiment, the electronic control unit 92 executes a switching control that includes steps S26 and S27 of the drive control in the first embodiment (refer to FIG. 6).

The electronic control unit 92 controls the transmission device 52 so that the ratio R decreases if the electronic control unit 92 switches from the second mode to the first mode.

The switching control will now be described with reference to FIG. 11. Steps S11, S12, S13, S14, S15, S16 and S17 of the switching control of the motor 54 in the fifth embodiment are respectively identical to steps S11, S12, S13, S14, S15, S16 and S17 of the switching control in the first embodiment shown in FIG. 5 and executed in the same order.

If the electronic control unit 92 is switched to the first mode in step S17, then the electronic control unit 92 proceeds to step S26 and determines whether or not the ratio R is greater than the second ratio R2. If the electronic control unit 92 determines that the ratio R is less than or equal to the second ratio R2, then the electronic control unit 92 terminates the processing and restarts the processing after a predetermined cycle from step S11. If the electronic control unit 92 determines that the ratio R is greater than the second ratio R2, then the electronic control unit 92 proceeds to step S27 and controls the transmission device 52 so that the ratio R becomes less than or equal to the second ratio R2. Then, the electronic control unit 92 terminates the processing and restarts the processing after a predetermined cycle from step S11.

The drive control will now be described with reference to FIG. 12. Steps S21, S22, S23. S24, and S25 of the drive control in the fifth embodiment are respectively identical to steps S21, S22, S23, S24 and S25 of the drive control in the first embodiment shown in FIG. 6 and executed in the same order. If the electronic control unit 92 determines in step S25 that an operation for stopping the motor 54 has been performed, then the electronic control unit 92 terminates the processing and restarts the processing after a predetermined cycle from step S21. Steps S14 and S15 can be omitted from the switching control of the fifth embodiment.

Sixth Embodiment

Figure 13:
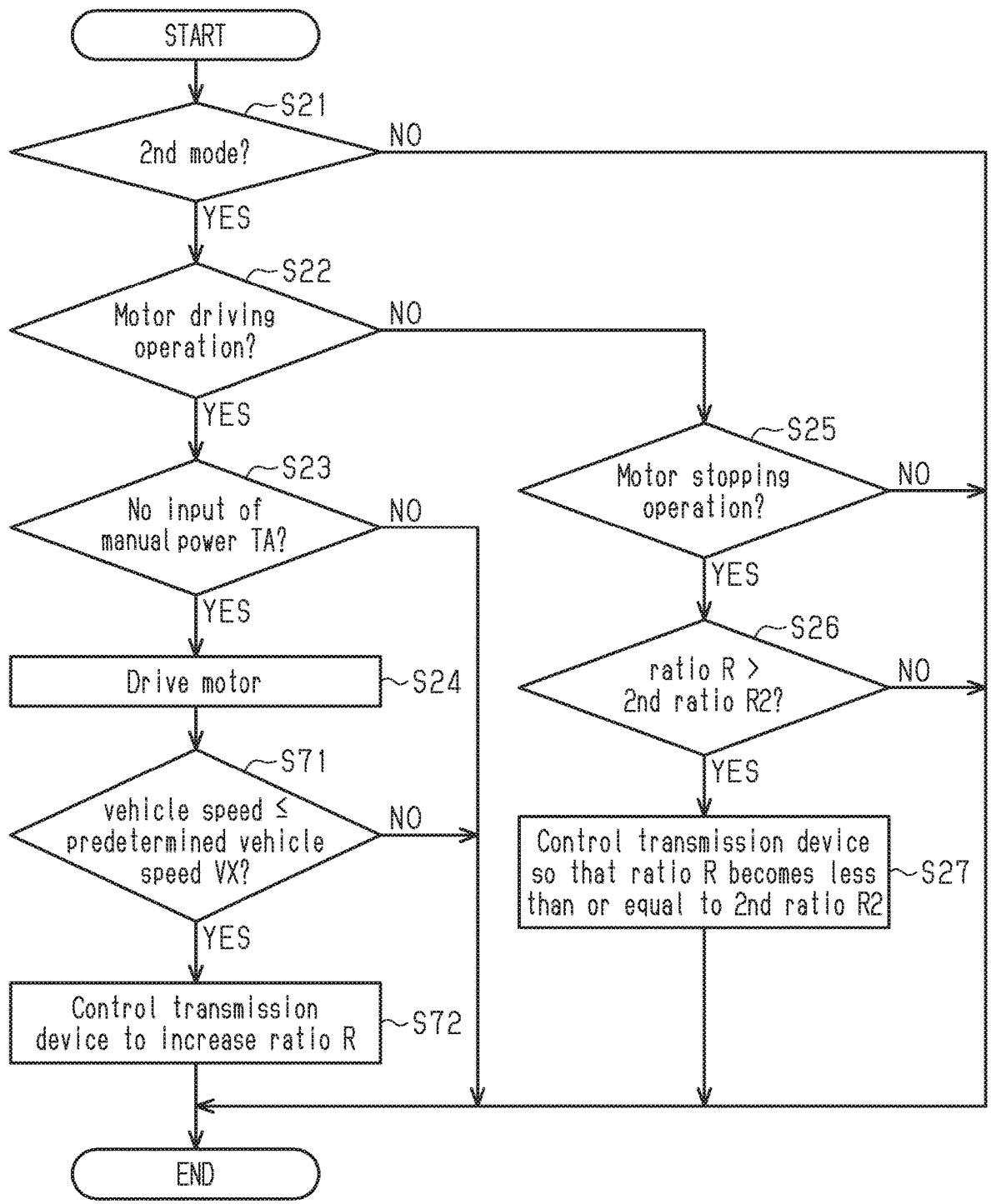
FIG. 13 is a flowchart of a drive control executed by the electronic control unit in accordance with a sixth embodiment.

The bicycle controller 90 of the sixth embodiment will now be described with reference to FIGS. 3 and 13. The bicycle controller 90 of the sixth embodiment differs from the bicycle controller 90 of the second embodiment only in the processing executed by the electronic control unit 92. Same reference numerals are given to those elements that are the same as the corresponding elements of the second embodiment. Such elements will not be described below.

The sixth embodiment differs from the second embodiment in the timing in which the ratio R is changed in the second mode.

The electronic control unit 92 controls the transmission device 52 in accordance with the vehicle speed V in the second mode. If the vehicle speed V is less than or equal to a predetermined vehicle speed VX in the second mode, then the electronic control unit 92 controls the transmission device 52 to increase the ratio R.

The drive control of the motor 54 in the second mode will now be described with reference to FIG. 13. Steps S21, S22, S23, S24, S25, S26 and S27 of the drive control in the sixth embodiment are respectively identical to steps S21, S22, S23, S24, S25, S26 and S27 of the drive control in the second embodiment shown in FIG. 8 and executed in the same order.

The electronic control unit 92 drives the motor 54 in step S24. Then, in step S71, the electronic control unit 92 determines whether or not the vehicle speed V is less than or equal to the vehicle speed VX. If the electronic control unit 92 determines that the vehicle speed V is greater than the predetermined vehicle speed VX, then the electronic control unit 92 terminates the processing and restarts processing after a predetermined cycle from step S21. If the electronic control unit 92 determines that the vehicle speed V is less than or equal to the predetermined vehicle speed VX in step S71, then the electronic control unit 92 proceeds to step S72 and controls the transmission device 52 to increase the ratio R. If the present ratio R is the maximum ratio R, the electronic control unit 92 maintains the present ratio R. After executing the process of step S72, the electronic control unit 92 terminates the processing and restarts the processing after a predetermined cycle from step S21. The predetermined vehicle speed VX is set to, for example, 1 km/h. if the vehicle speed V becomes less than the predetermined vehicle speed VX while the rider is walking and pushing the bicycle 10, then the ratio R is increased. This avoids situations in which the vehicle speed V becomes too slow while the rider is walking and pushing the bicycle 10.

Seventh Embodiment

The bicycle controller 90 of a seventh embodiment will now be described with reference to FIGS. 3 and 14. The bicycle controller 90 of the seventh embodiment differs from the bicycle controller 90 of the second embodiment only in the processing executed by the electronic control unit 92. Same reference numerals are given to those elements that are the same as the corresponding elements of the second embodiment. Such elements will not be described below. The seventh embodiment differs from the second embodiment in the conditions for changing the ratio R in the second mode.

If the electronic control unit 92 detects slipping of the wheel 14 while driving the motor 54 in the second mode. then the electronic control unit 92 controls the transmission device 52 to increase the ratio R. If the electronic control unit 92 detects slipping of the wheel 14 while driving the motor 54 in the second mode, then the electronic control unit 92 decreases the output torque TM of the motor 54.

The drive control in the second mode will now be described with reference to FIG. 14. Steps S21, S22, S23, S24, S25, S26 and S27 of the drive control in the seventh embodiment are respectively identical to steps S21, S22, S23, S24, S25, S26 and S27 of the drive control in the second embodiment shown in FIG. 8 and executed in the same order.

The electronic control unit 92 drives the motor 54 in step S24. Then, in step S81, the electronic control unit 92 determines whether or not slipping of the wheel 14 has been detected. In one example, the electronic control unit 92 determines that slipping of the wheel 14 has been detected if the electronic control unit 92 determines that the rotational speed N of the motor 54, the rotational speed of the wheel 14, or the rotational speed N of a rotation body included in the transmission path L has suddenly increased. If the electronic control unit 92 determines that slipping of the wheel 14 has not been detected, then the electronic control unit 92 terminates the processing and restarts the processing after a predetermined cycle from step S21.

If the electronic control unit 92 determines that slipping of the wheel 14 has been detected in step S81, the electronic control unit 92 proceeds to step S82 and controls the transmission device 52 to increase the ratio R. Then, the electronic control unit 92 proceeds to step S83. If the present ratio R is the maximum ratio R, then the electronic control unit 92 maintains the present ratio R. In step S83, the electronic control unit 92 decreases the output torque TM of the motor 54. Subsequent to the execution of the process of step S83, the electronic control unit 92 restarts the processing after a predetermined cycle from step S21.

One of steps S82 and S83 can be omitted from the drive control of the sixth embodiment. Alternatively, step S82 and steps S25 to S27 can be omitted from the drive control of the sixth embodiment. As another option. step S83 and steps S25 to S27 can be omitted from the drive control of the sixth embodiment. As a further option, steps S25 to S27 can be omitted from the drive control of the sixth embodiment.

Eighth Embodiment

Figure 15:
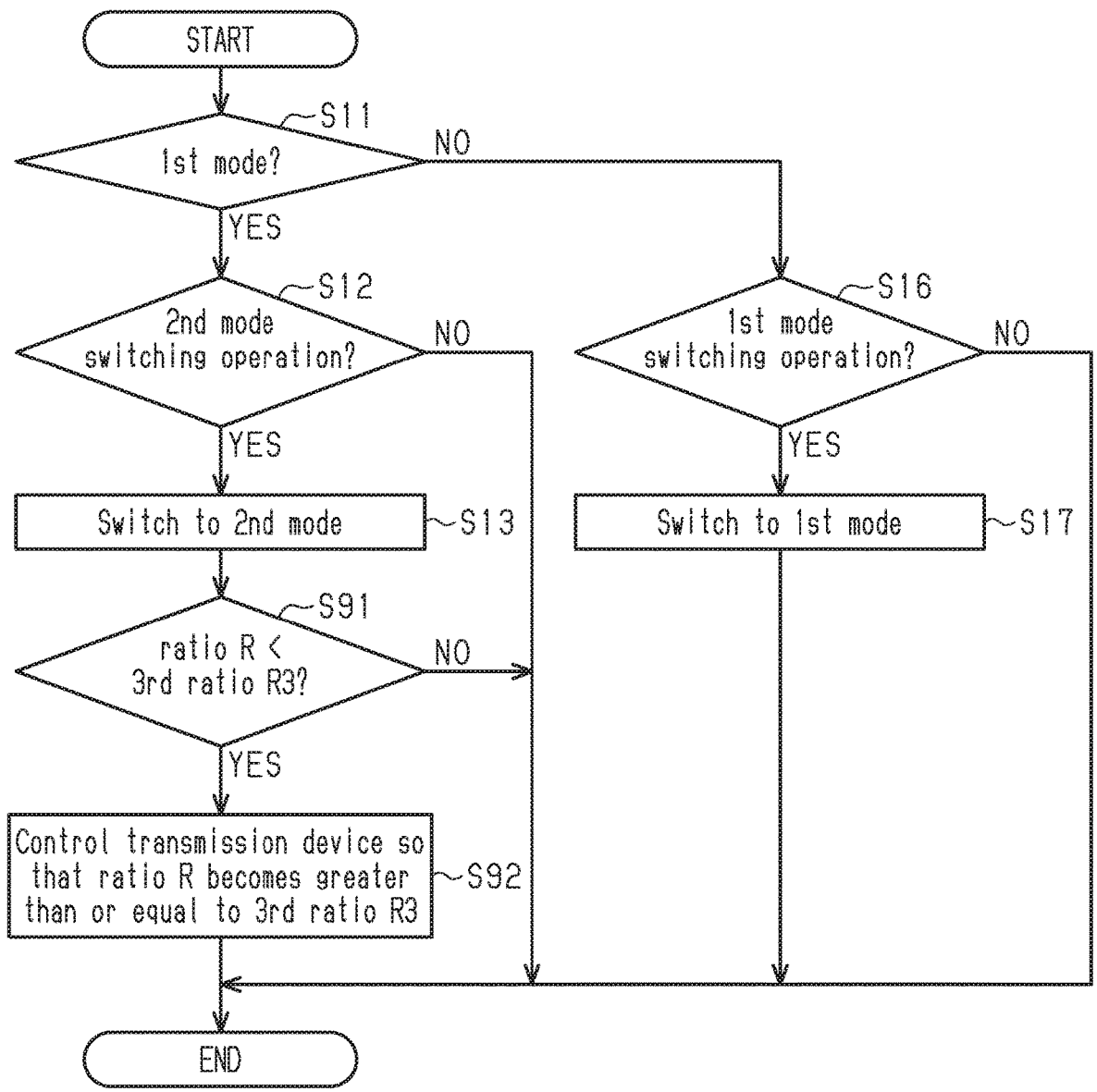
FIG. 15 is a flowchart of a switching control executed by the electronic control unit in accordance with an eighth embodiment.

The bicycle controller 90 of an eighth embodiment will now be described with reference to FIGS. 3 and 15. The bicycle controller 90 of the eighth embodiment differs from the bicycle controller 90 of the first embodiment only in the processing executed by the electronic control unit 92. Same reference numerals are given to those elements that are the same as the corresponding elements of the second embodiment. Such elements will not be described below. The eighth embodiment increases the ratio R if the electronic control unit 92 switches to the second mode in the switching control. The lectronic control unit 92 controls the transmission device 52 to increase the ratio R in a case in which the electronic control unit 92 switches from the first mode to the second mode.

The switching control will now be described with reference to FIG. 15. Steps S11, S12, S13, S16 and S17 of the switching control in the eighth embodiment are respectively identical to steps S11, S12, S13, S16 and S17 of the switching control of the motor 54 in the first embodiment shown in FIG. 5 and executed in the same order.

The electronic control unit 92 switches to the second mode in step S13. Then, the electronic control unit 92 proceeds to step S91 and determines whether or not the ratio R is less than a third ratio R3. If the electronic control unit 92 determines that the ratio R is greater than or equal to the third ratio R3, then the electronic control unit 92 terminates the processing and restarts the processing after a predetermined cycle from step S11. If the electronic control unit 92 determines in step S91 that the ratio R is less than the third ratio R3, then the electronic control unit 92 proceeds to step S92. In step S92, the electronic control unit 92 controls the transmission device 52 so that the ratio R becomes greater than or equal to the third ratio R3 and then restarts the processing after a predetermined cycle from step S11. Preferably, the electronic control unit 92 controls the transmission device 52 so that the ratio R becomes equal to the third ratio R3 in step S92. If the third ratio R3 is not the maximum ratio R that can be realized by the transmission device 52, then the electronic control unit 92 can increase the ratio R so that the ratio R becomes greater than the third ratio R3.

Ninth Embodiment

Figure 16:
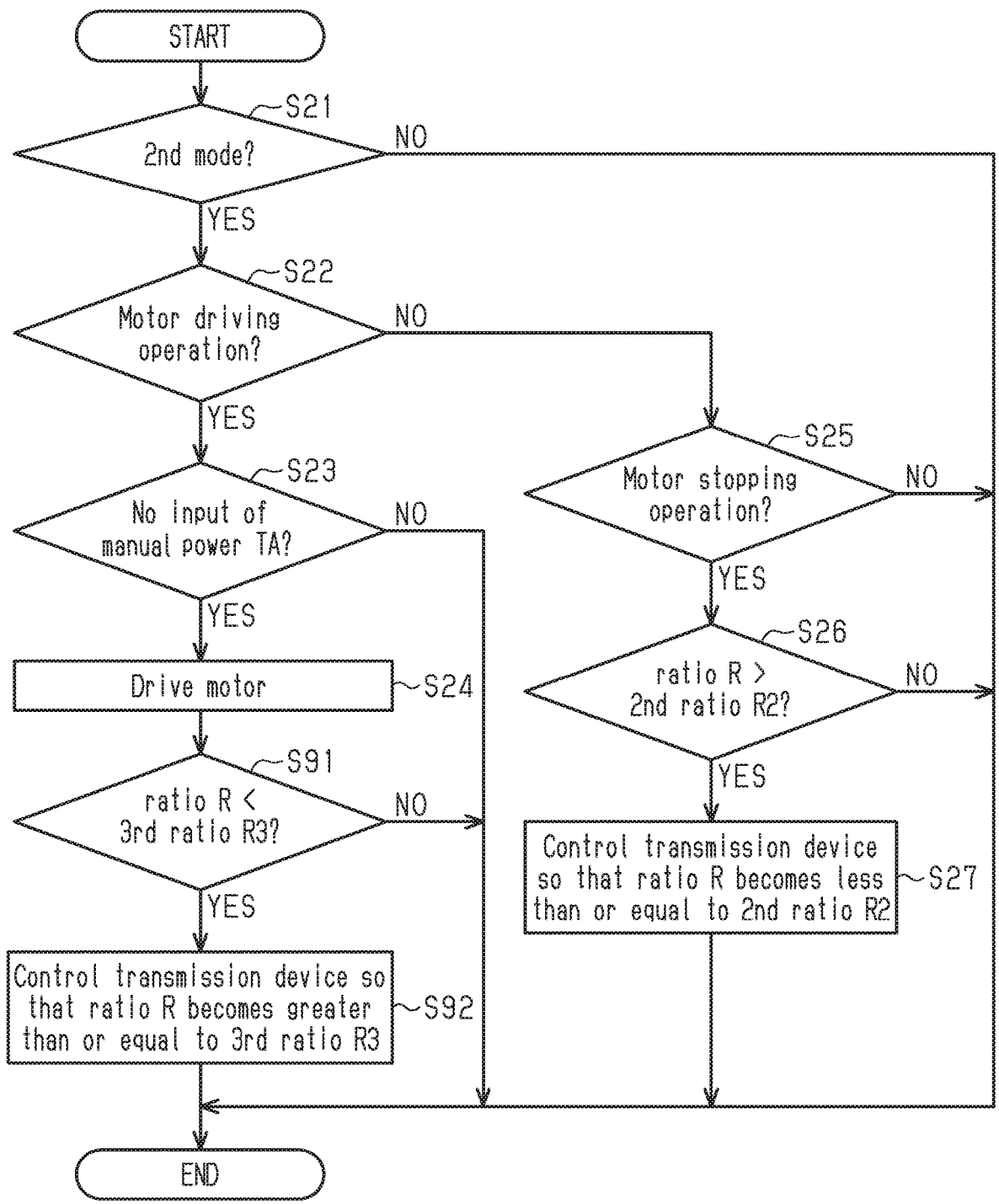
FIG. 16 is a flowchart of a drive control executed by the electronic control unit in accordance with a ninth embodiment.

The bicycle controller 90 of a ninth embodiment will now be described with reference to FIGS. 3 and 16. The bicycle controller 90 of the ninth embodiment differs from the bicycle controller 90 of the second embodiment only in the processing executed by the electronic control unit 92. Same reference numerals are given to those elements that are the same as the corresponding elements of the second embodiment. Such elements will not be described below.

If an operation for driving the motor 54 is performed on the operation device 58 in the second mode, then the electronic control unit 92 drives the motor 54 and controls the transmission device 52 to increase the ratio R. The drive control will now be described with reference to FIG. 16.

Steps S21, S22, S23, S24, S25, S26 and S27 of the drive control in the ninth embodiment are respectively identical to steps S21, S22, S23, S24, S25, S26 and S27 of the drive control in the second embodiment shown in FIG. 8 and executed in the same order.

If the electronic control unit 92 determines that there is no input of the manual driving force TA in step S23, the electronic control unit 92 drives the motor 54 in step S24. Then, in step S91, the electronic control unit 92 determines whether or not the ratio R is less than the third ratio R3. If the electronic control unit 92 determines that the ratio R is greater than or equal to the third ratio R3, then the electronic control unit 92 terminates the processing and restarts the processing after a predetermined cycle from step S21. If the electronic control unit 92 determines that the ratio R is less than the third ratio R3, then the electronic control unit 92 proceeds to step S92 and controls the transmission device 52 so that the ratio R becomes greater than or equal to the third ratio R3. Then, the electronic control unit 92 terminates the processing and restarts the processing after a predetermined cycle from step S21. Steps S91 and S92 or steps S25 to S27 can be omitted from the drive control of the ninth embodiment.

Tenth Embodiment

Figure 17:
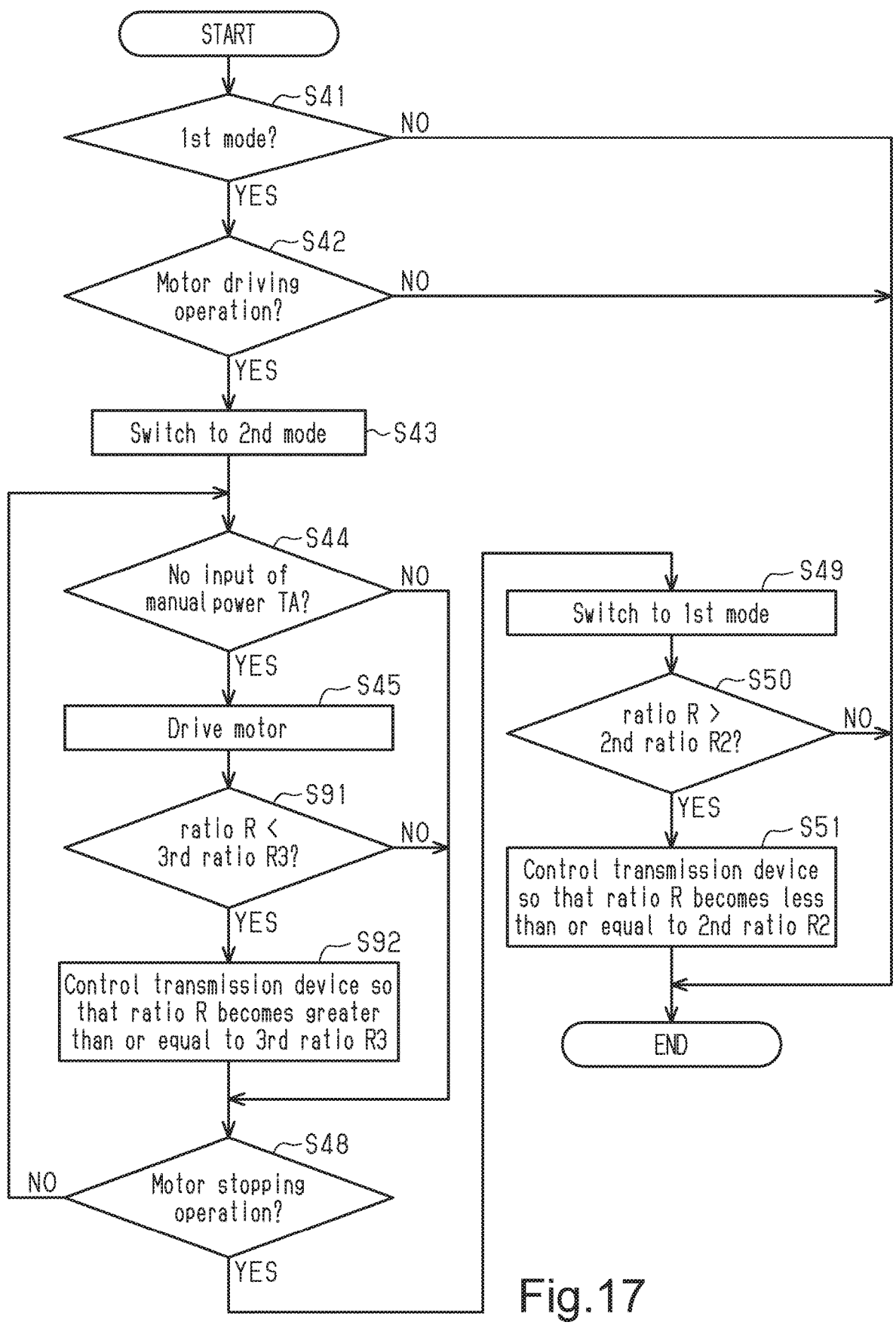
FIG. 17 is a flowchart of a switching-drive control executed by the electronic control unit in accordance with a tenth embodiment.

The bicycle controller 90 of the tenth embodiment will now be described with reference to FIGS. 3 and 17. The bicycle controller 90 of the tenth embodiment differs from the bicycle controller 90 of the fourth embodiment only in the processing executed by the electronic control unit 92. Same reference numerals are given to those elements that are the same as the corresponding elements of the fourth embodiment. Such elements will not be described below.

If an operation for driving the motor 54 is performed on the operation device 58 in the first mode, then the electronic control unit 92 switches from the first mode to the second mode, drives the motor 54, and controls the transmission device 52 to increase the ratio R.

Figure 10:
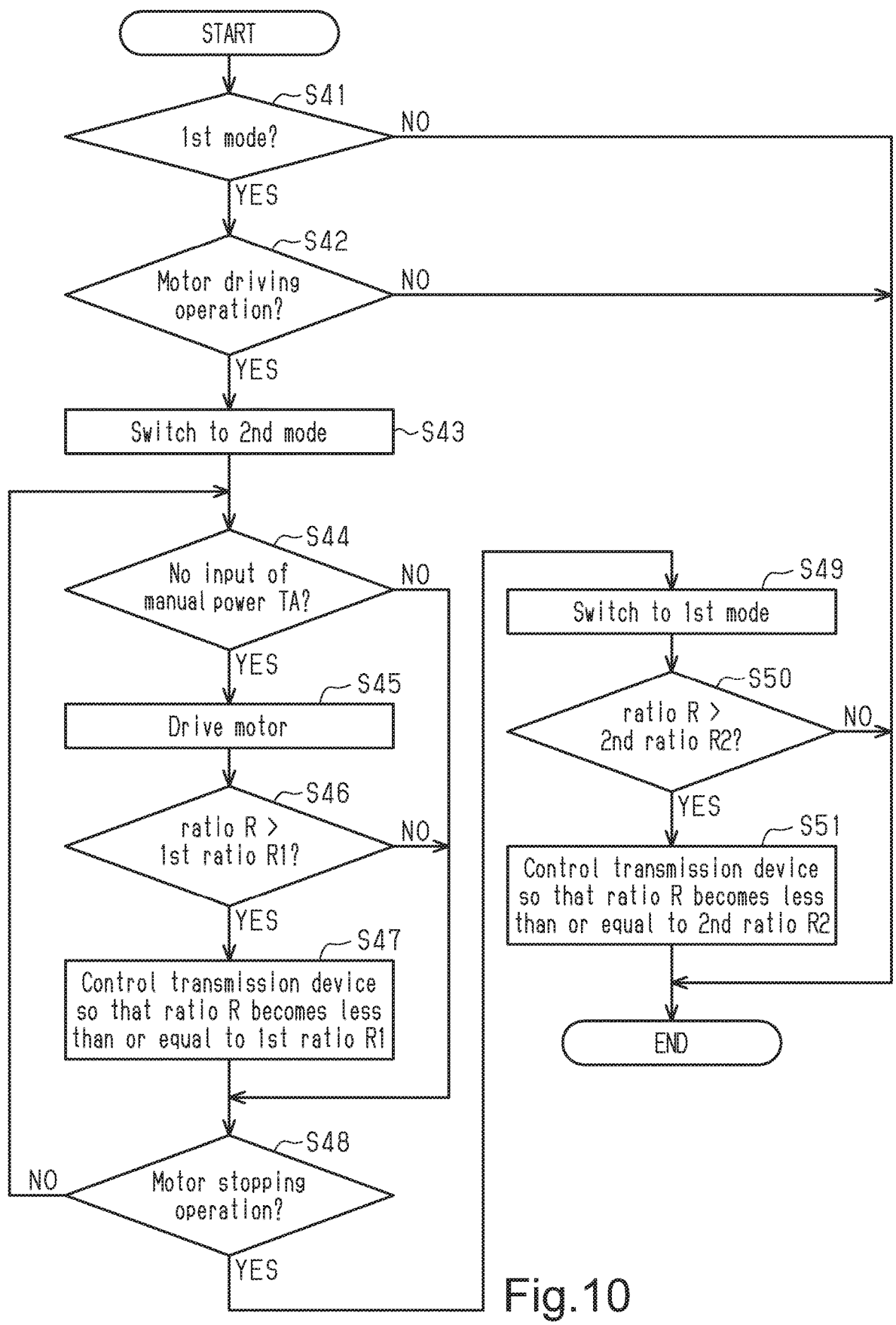
FIG. 10 is a flowchart of a switching-drive control executed by the electronic control unit in accordance with a fourth embodiment.

In the switching control of the tenth embodiment, steps S91 and S92 are executed in lieu of steps S46 and S47 of the switching-drive control of the switching-drive control in the fourth embodiment shown in FIG. 10. Steps S41, S42, S43, S44, S45, S48, S49, S50 and S51 of the switching-drive control in the tenth embodiment are respectively identical to steps S41, S42, S43, S44, S45, S48, S49, S50 and S51 of the switching-drive control in the fourth embodiment shown in FIG. 10 and executed in the same order.

If the electronic control unit 92 drives the motor 54 in step S45, then the electronic control unit 92 proceeds to step S91. In step S91, the electronic control unit 92 determines whether or not the ratio R is less than the third ratio R3. If the electronic control unit 92 determines that the ratio R is greater than or equal to the third ratio R3, then the electronic control unit 92 proceeds to step S48. If the electronic control unit 92 determines that the ratio R is less than the third ratio R3, then the electronic control unit 92 proceeds to step S92 and controls the transmission device 52 so that the ratio R becomes greater than or equal to the third ratio R3. Then, the electronic control unit 92 proceeds to step S48.

MODIFIED EXAMPLES

It should be apparent to those skilled in the art that the present invention may be embodied in many other specific forms without departing from the spirit or scope of the invention. For example, sonic of the components can be omitted from the components described in the embodiments (or one or more forms of the embodiments). Further, components in different embodiments can be appropriately combined. The scope of the present invention and equivalence of the present invention are to be understood with reference to the appended claims.

Step S31 of the drive control in the third embodiment shown in FIG. 9 can be modified as described below. The electronic control unit 92 determines whether or not the output torque TM of the motor 54 has been held at a maximum value of the output torque which is set to the motor 54. If, the electronic control unit 92 determines that the output torque TM of the motor 54 has been held at the maximum value of the output torque, then the electronic control unit 92 proceeds to step S14. If the electronic control unit 92 determines that the output torque TM of the motor 54 has not been held at the maximum value of the output torque, the electronic control unit 92 terminates the processing and restarts the processing after a predetermined cycle from step S21.

Figure 9:
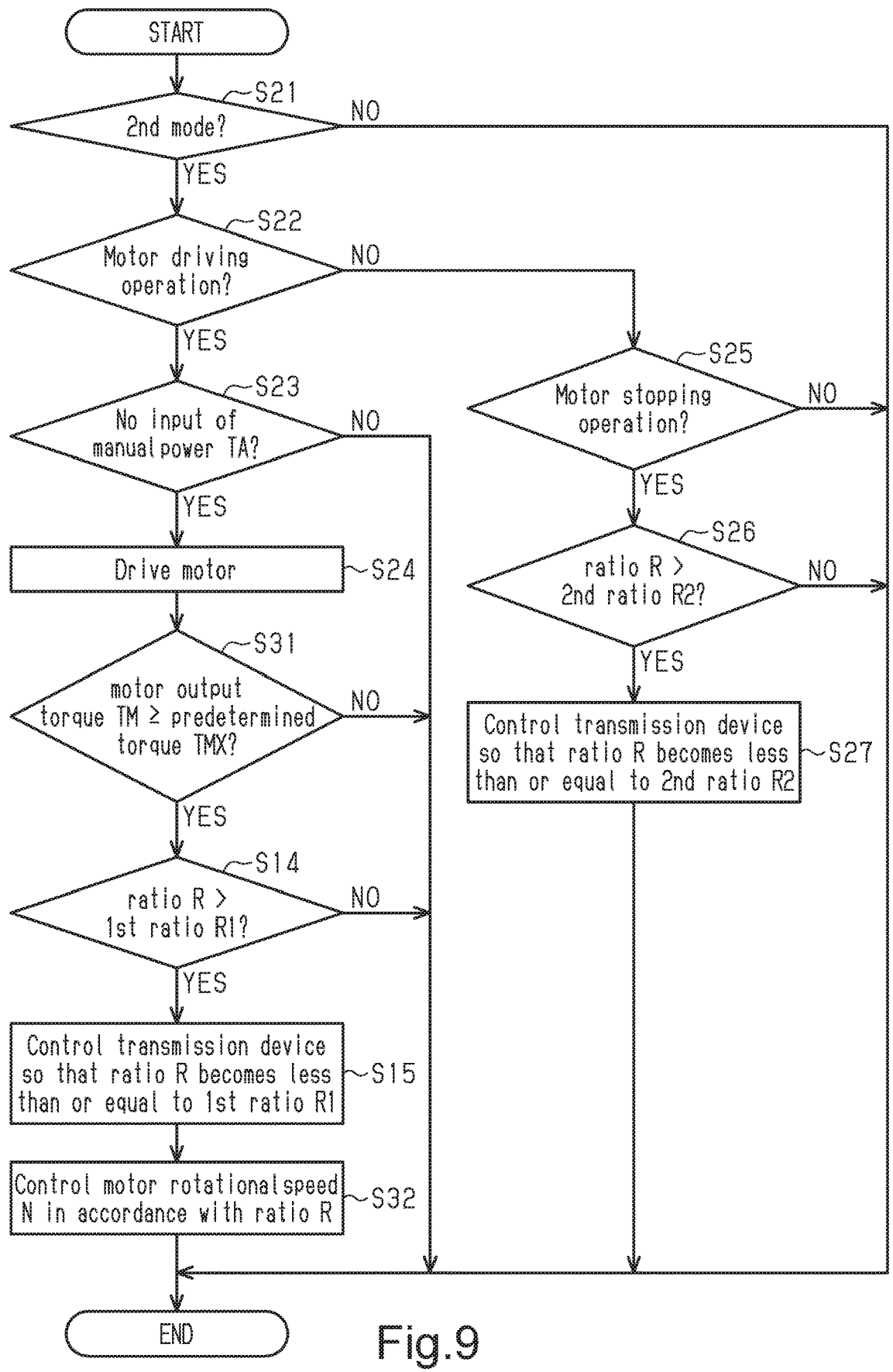
FIG. 9 is a flowchart of a drive control executed by the electronic control unit in accordance with a third embodiment.
Figure 18:
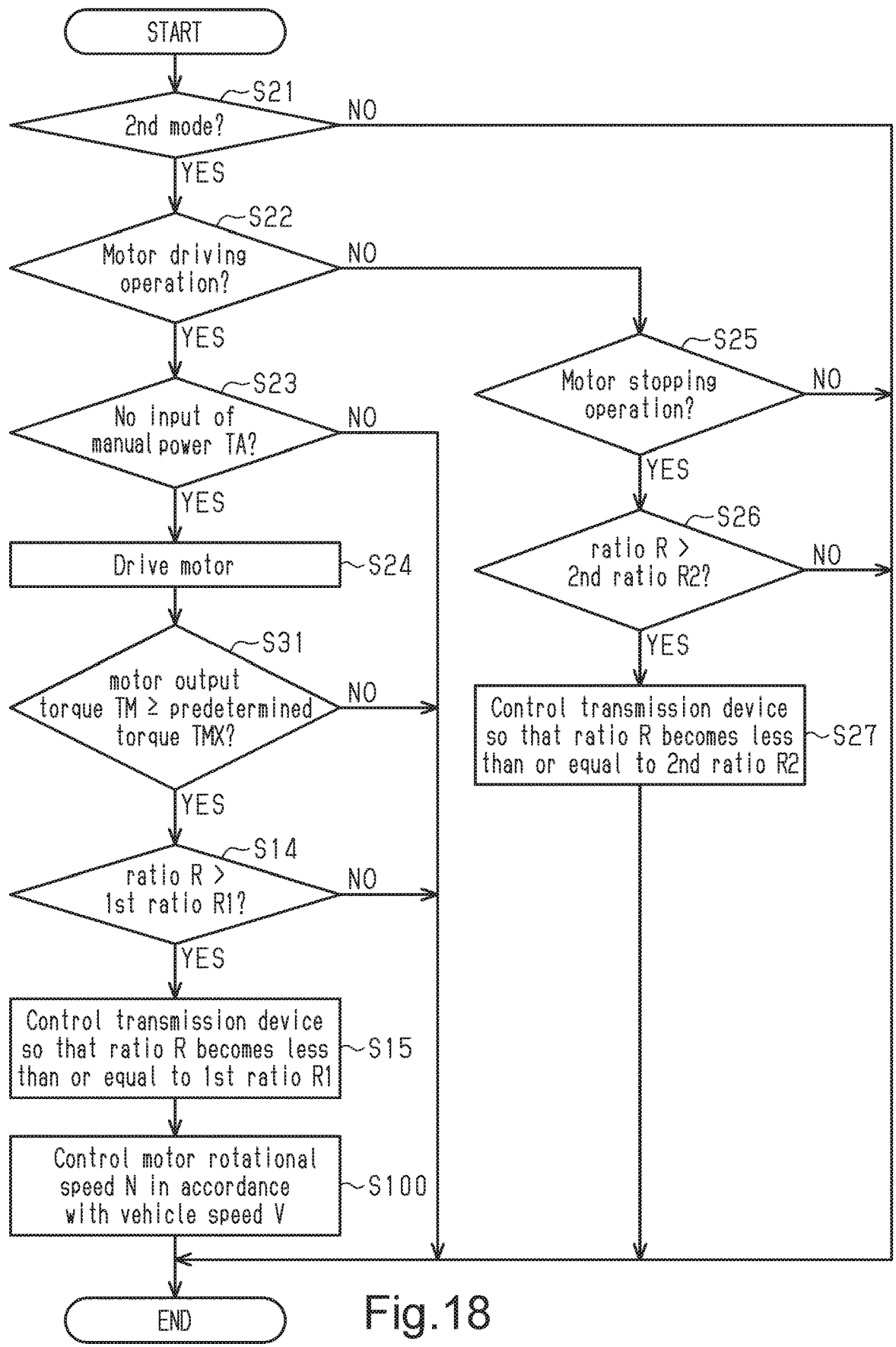
FIG. 18 is a flowchart of a drive control in accordance with a first modification.

The drive control of the third embodiment shown in FIG. 9 can be modified to the drive control shown in FIG. 18. The electronic control unit 92 is configured to be switched between the first mode, which controls the motor 54 in accordance with the manual driving force TA, and the second mode, which allows the motor 54 to be controlled so that the bicycle can be moved. The electronic control unit 92 controls the rotational speed N of the motor 54 in accordance with the vehicle speed V in the second mode. More specifically, the electronic control unit 92 executes the process of step S100 in FIG. 18 instead of the process of step S32 in FIG. 9. In step S15, the electronic control unit 92 controls the transmission device 52 so that the vehicle speed V becomes less than or equal to a first speed V1. Then, the electronic control unit 92 proceeds to step S100 and controls the rotational speed N of the motor 54 in accordance with the vehicle speed V. More specifically, the rotational speed N of the motor 54 is increased as the vehicle speed V decreases.

If the electronic control unit 92 switches between the first mode and the second mode or is in the second mode in the first to fifth embodiments, then the electronic control unit 92 can control the transmission device 52 so that the ratio R becomes equal to a first predetermined ratio RA. More specifically, step S14 can be omitted from the first to third and fifth embodiments and step S46 can be omitted from the fourth embodiment. In this case, instead of the process of step S15 in the first to third and fifth embodiments and the process of step S47 in the fourth embodiment, the electronic control unit 92 performs a process for controlling the transmission device 52 so that the ratio R becomes equal to the first predetermined ratio RA, which is stored in advance in the memory 94.

If the electronic control unit 92 switches between the first mode and the second mode or is in the first mode in each embodiment, then the electronic control unit 92 can control the transmission device 52 so that the ratio R becomes equal to a second predetermined ratio RB. More specifically, step S26 can be omitted from the first to third and fifth embodiments and step S50 can be omitted from the fourth embodiment. In this case, instead of the process of step S27 in the first to third and fifth embodiments and step S51 of the fourth embodiment, the electronic control unit 92 performs a process for controlling the transmission device 52 so that the ratio R becomes equal to the second predetermined ratio RB, which is stored in advance in the memory 94.

If the electronic control unit 92 switches between the first mode and the second mode or is in the second in the eighth to tenth embodiments, then the electronic control unit 92 can control the transmission device 52 so that the ratio R becomes equal to the third predetermined ratio RC. More specifically, step S91 can be omitted from the eighth to tenth embodiments. In this case, instead of the process of step S92 of the eighth to tenth embodiments, the electronic control unit 92 performs a process for controlling the transmission device 52 so that the ratio R becomes equal to the third predetermined ratio RC, which is stored in advance in the memory 94.

Figure 14:
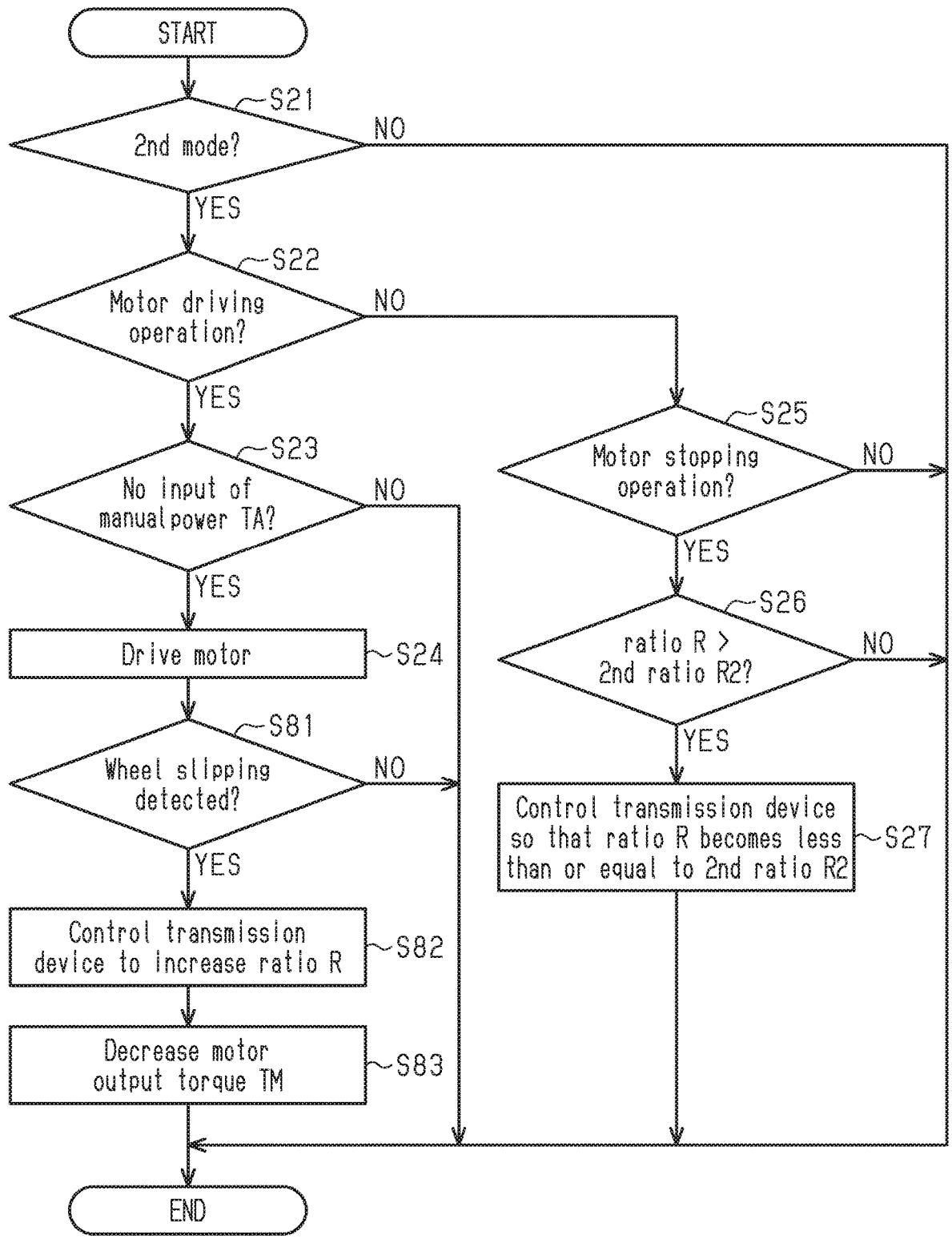
FIG. 14 is a flowchart of a drive control executed by the electronic control unit in accordance with a seventh embodiment.

In step S81 of the driving process in the seventh embodiment shown in FIG. 14, if the electronic control unit 92 detects slipping of the wheel 14, then the electronic control unit 92 can further perform at least one of reducing the speed of the bicycle 10 with an electric brake and reducing the speed of the motor 54.

Figure 19:
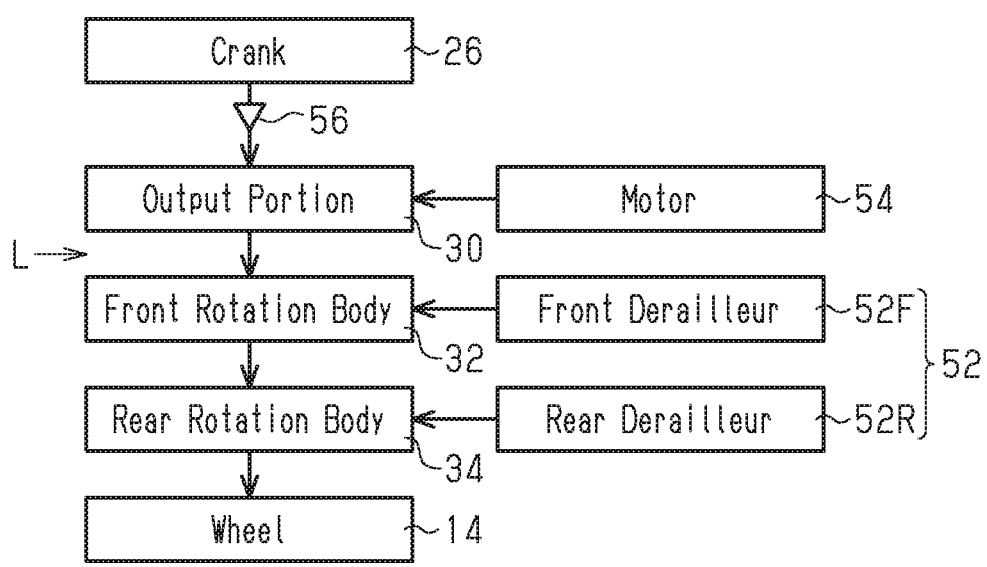
FIG. 19 is a schematic diagram of a manual driving force transmission path of a bicycle in accordance with a second modification.

As shown in FIG. 19, in each embodiment, the transmission device 52 can include an external transmission device (derailleur). The transmission device 52 changes the speed of the rotation input to the crankshaft 38 and transmits the rotation to the wheel 14 by moving the chain 36 between a plurality of front rotation bodies 32 or a plurality of rear rotation bodies 34. The transmission device 52 includes at least one of a front derailleur 52F and a rear derailleur 52R. The front derailleur 52F moves the chain 36 (refer to FIG. 1) between the front rotation bodies 32. The rear derailleur 52R moves the chain 36 between the rear rotation bodies 34. If the transmission device 52 includes a derailleur, then the speed-changing operation includes moving the chain 36 between the rotation bodies 32 and 34. The transmission device 52 can include both of an internal transmission device and a derailleur.

In each embodiment, the electronic control unit 92 can operate the transmission device 52 in accordance with the state of the bicycle 10 or the riding environment. For example, the electronic control unit 92 can operate the transmission device 52 in accordance with the rotational speed N of the crank 26.

In addition to or instead of the first switch 74 and the second switch 76, the operation device 58 can include a mode switch for switching between the first mode and the second mode. In this case, the mode switch is pushed to switch the electronic control unit 92 between the first mode and the second mode.

If the second switch 76 is operated in the standby mode in the second mode, then the electronic control unit 92 can switch to the drive mode. Further, if the second switch 76 is operated in the drive mode, the electronic control unit 92 can switch to the standby mode. In this case, the second switch 76 does not have to be continuously pushed to drive the motor 54 that provides assistance when the rider is walking and pushing the bicycle.

What is claimed is:

1. A bicycle controller comprising:
an electronic control unit that controls a transmission device, which is configured to change a ratio of a rotational speed of a wheel of a bicycle to a rotational speed of a crank of the bicycle, and a motor, which transmits torque to an upstream side of the transmission device in a transmission path of manual driving force that is input to the crank,
the electronic control unit being configured to switch between a first mode that drives the motor in accordance with the manual driving force and a second mode that allows the motor to be driven to assist movement of the bicycle while a rider walks and pushes the bicycle, and
the electronic control unit being configured to control the transmission device to change the ratio upon detection of the electronic control unit switching between the first mode and the second mode or the electronic control unit being in the second mode.

2. The bicycle controller according to claim 1, wherein the electronic control unit is configured to control the transmission device to decrease the ratio upon detection of the electronic control unit switching from the first mode to the second mode.

3. The bicycle controller according to claim 1, wherein the electronic control unit is configured to drive the motor and controls the transmission device to decrease the ratio upon detection of an operation device being operated to drive the motor while in the second mode.

4. The bicycle controller according to claim 1, wherein the electronic control unit is configured to switch from the first mode to the second mode and then drive the motor and controls the transmission device to decrease the ratio upon detection of an operation device being operated to drive the motor while in the first mode.

5. The bicycle controller according to claim 1, wherein the electronic control unit is configured to control the transmission device to decrease the ratio upon detection of the electronic control unit switching from the second mode to the first mode.

6. The bicycle controller according to claim 1, wherein the electronic control unit is configured to control the transmission device so that the ratio becomes less than or equal to a predetermined first ratio while in the second mode.

7. The bicycle controller according to claim 1, wherein the electronic control unit is configured to drive the motor and control the transmission device to increase the ratio upon detection of an operation device being operated to drive the motor while in the second mode.

8. The bicycle controller according to claim 1, wherein the electronic control unit is configured to switch from the first mode to the second mode, drive the motor and control the transmission device to increase the ratio upon detection of an operation device being operated to drive the motor while in the first mode.

9. The bicycle controller according to claim 1, wherein the electronic control unit is configured to control the transmission device so that the ratio becomes less than or equal to a predetermined second ratio upon detection of an operation device being operated to stop the motor while in the second mode.

10. The bicycle controller according to claim 1, wherein the electronic control unit is configured to control the transmission device in accordance with a vehicle speed of the bicycle in the second mode.

11. The bicycle controller according to claim 1, wherein the electronic control unit is configured to control the transmission device in accordance with a vehicle speed of the bicycle while in the second mode, and the electronic control unit is configured to control the transmission device to increase the ratio upon detection of the vehicle speed of the bicycle being less than or equal to a predetermined vehicle speed while in the second mode.

12. The bicycle controller according to claim 1, wherein the electronic control unit is configured to control the transmission device to decrease the ratio upon detection of an output torque of the motor becoming greater than or equal to a predetermined torque while in the second mode.

13. The bicycle controller according to claim 1, wherein the electronic control unit is configured to control a rotational speed of the motor in accordance with the ratio in the second mode.

14. The bicycle controller according to claim 13, wherein the electronic control unit is configured to control the rotational speed of the motor upon detection of the transmission device changing the ratio so that a difference between a vehicle speed of the bicycle before the ratio is changed and the vehicle speed of the bicycle after the ratio is changed is less than or equal to a predetermined value.

15. The bicycle controller according to claim 1, wherein the electronic control unit is configured to drive the motor upon determining the manual driving force is not being inputted to the crank while in the second mode.

16. The bicycle controller according to claim 1, wherein the electronic control unit is configured to control the transmission device to increase the ratio upon detection of slipping of the wheel while driving the motor while in the second mode.

17. The bicycle controller according to claim 1, wherein the electronic control unit is configured to decrease an output torque of the motor upon detection of slipping of the wheel while driving the motor while in the second mode.

18. A bicycle control system comprising the bicycle controller according to claim 1, and further comprising the transmission device; and the motor;

the transmission device including an internal transmission device.

19. The bicycle control system according to claim 18, further comprising a clutch that interrupts transmission of rotation of the motor to the crank in a situation in which the bicycle moves forward.

20. The bicycle control system according to claim 19, further comprising a clutch that interrupts transmission of rotation of the motor to the crank in a situation in which the bicycle moves forward.

21. A bicycle control system comprising the bicycle controller according to claim 1, arid further comprising the transmission device; and the motor;

the transmission device including a derailleur.

* * * * *